(12) United States Patent
Kumano et al.

(10) Patent No.: US 12,459,537 B2
(45) Date of Patent: Nov. 4, 2025

(54) AUTONOMOUS DRIVING APPARATUS AND RULE DETERMINATION APPARATUS

(71) Applicant: DENSO CORPORATION, Kariya (JP)

(72) Inventors: Shunya Kumano, Nisshin (JP); Satoru Yoshikawa, Nisshin (JP); Hiroyuki Osawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 702 days.

(21) Appl. No.: 17/807,012

(22) Filed: Jun. 15, 2022

(65) Prior Publication Data

US 2022/0348225 A1 Nov. 3, 2022

Related U.S. Application Data

(63) Continuation of application No. PCT/JP2020/047068, filed on Dec. 17, 2020.

(30) Foreign Application Priority Data

Dec. 18, 2019 (JP) ................. 2019-228547

(51) Int. Cl.
*B60W 60/00* (2020.01)
*B60W 30/16* (2020.01)
(Continued)

(52) U.S. Cl.
CPC ........ *B60W 60/0011* (2020.02); *B60W 30/16* (2013.01); *B60W 40/04* (2013.01);
(Continued)

(58) Field of Classification Search
CPC ......... B60W 60/0011; B60W 60/0015; B60W 30/16; B60W 40/04; B60W 50/0205;
(Continued)

(56) References Cited

U.S. PATENT DOCUMENTS 9,720,411 B2\* 8/2017 Crombez ............. G05D 1/0259
10,133,275 B1\* 11/2018 Kobilarov ......... B60W 60/0016
(Continued)

FOREIGN PATENT DOCUMENTS

| DE | 102015205074 A1 | 3/2016 |
| JP | 2009-101973 A | 5/2009 |
| WO | 2016/067336 A1 | 5/2016 |

*Primary Examiner* — Huan Le
(74) *Attorney, Agent, or Firm* — Maschoff Brennan

(57) ABSTRACT

An autonomous driving apparatus, which is used in a subject vehicle capable of performing an autonomous driving, is configured to: determine a deviation value of each of one or more candidate routes, which indicates a possibility of the subject vehicle deviating from a traveling rule when the subject vehicle travels the corresponding candidate route, based on a comparison result between an inter-vehicle distance and a minimum control permission distance; select one candidate route having the deviation value within a control permission range as a target route; output an instruction for controlling the subject vehicle to travel along the selected target route; execute a traveling control of the subject vehicle according to the instruction; and update a determination rule of the deviation value in response to a change in a sensor that detects a behavior of at least one of the subject vehicle or the peripheral vehicle.

14 Claims, 15 Drawing Sheets

(51) Int. Cl.
*B60W 40/04* (2006.01)
*B60W 50/00* (2006.01)
*B60W 50/02* (2012.01)
*H04W 4/40* (2018.01)

(52) U.S. Cl.
CPC .... *B60W 50/0205* (2013.01); *B60W 60/0015* (2020.02); *H04W 4/40* (2018.02); *B60W 2050/0043* (2013.01); *B60W 2050/0215* (2013.01); *B60W 2554/4046* (2020.02); *B60W 2554/80* (2020.02); *B60W 2556/45* (2020.02)

(58) Field of Classification Search
CPC . B60W 2050/0043; B60W 2050/0215; B60W 2554/45; B60W 2556/45; H04W 4/40
See application file for complete search history.

(56) References Cited

U.S. PATENT DOCUMENTS

| | | | |
|---|---|---|---|
| 11,970,186 B2* | 4/2024 | Horigome | B60W 60/0011 |
| 2018/0215389 A1 | 8/2018 | Takae | |
| 2019/0291727 A1 | 9/2019 | Shalev-Shwartz et al. | |
| 2019/0295179 A1 | 9/2019 | Shalev-Shwartz et al. | |
| 2019/0299983 A1 | 10/2019 | Shalev-Shwartz et al. | |
| 2019/0329768 A1 | 10/2019 | Shalev-Shwartz et al. | |
| 2019/0329769 A1 | 10/2019 | Shalev-Shwartz et al. | |
| 2019/0329773 A1 | 10/2019 | Shalev-Shwartz et al. | |
| 2019/0329782 A1 | 10/2019 | Shalev-Shwartz et al. | |
| 2019/0329783 A1 | 10/2019 | Shalev-Shwartz et al. | |
| 2019/0333381 A1 | 10/2019 | Shalev-Shwartz et al. | |
| 2021/0110483 A1 | 4/2021 | Shalev-Shwartz et al. | |
| 2021/0110484 A1 | 4/2021 | Shalev-Shwartz et al. | |
| 2021/0142421 A1 | 5/2021 | Shalev-Shwartz et al. | |
| 2021/0166325 A1 | 6/2021 | Shalev-Shwartz et al. | |
| 2022/0009485 A1* | 1/2022 | Sakashita | B60W 40/08 |

* cited by examiner

AUTONOMOUS DRIVING APPARATUS AND RULE DETERMINATION APPARATUS

CROSS REFERENCE TO RELATED APPLICATIONS

The present application is a continuation application of International Patent Application No. PCT/JP 2020/047068 filed on Dec. 17, 2020, which designated the U.S. and claims the benefit of priority from Japanese Patent Application No. 2019-228547 filed on Dec. 18, 2019. The entire disclosures of all of the above applications are incorporated herein by reference.

TECHNICAL FIELD

The present disclosure relates to an autonomous driving apparatus and a rule determination apparatus.

BACKGROUND

Conventionally, an autonomous driving apparatus and a rule determination apparatus which controls an autonomous driving of a vehicle according to a traveling rule is known.

SUMMARY

The present disclosure provides an autonomous driving apparatus, which is used in a subject vehicle capable of performing an autonomous driving, is configured to: determine a deviation value of each of one or more candidate routes based on a comparison result between an inter-vehicle distance and a minimum control permission distance, the inter-vehicle distance being a distance between the subject vehicle and a peripheral vehicle existing around the subject vehicle, the deviation value indicating a possibility of the subject vehicle deviating from a traveling rule in a case where the subject vehicle travels along the corresponding candidate route, the one or more candidate routes being planned such that each of the one or more candidate routes enables the subject vehicle to continue traveling; select, from the one or more candidate routes, one candidate route having the deviation value within a control permission range as a target route of the subject vehicle; output an instruction for controlling the subject vehicle to travel along the selected target route; execute a traveling control of the subject vehicle according to the outputted instruction; and update a determination rule of the deviation value used to determine the deviation value in response to a change in a sensor that detects a behavior of at least one of the subject vehicle or the peripheral vehicle.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
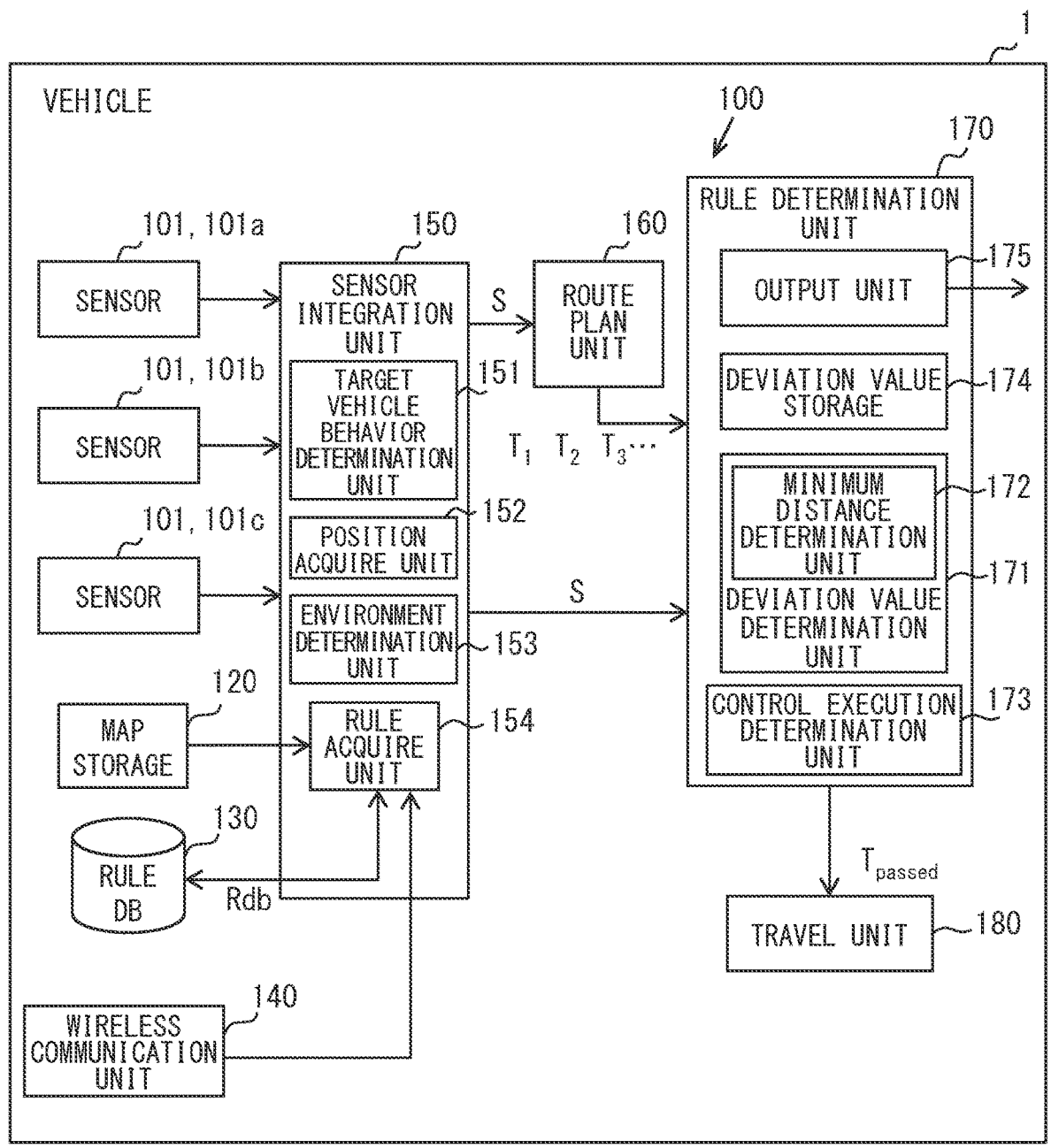
FIG. 1 is a diagram showing a configuration of an autonomous driving apparatus according to a first embodiment.

Before describing embodiments of the present disclosure, a known technology will be described. Technology for autonomous driving of a vehicle is well known. WO 2018/115963 A discloses an apparatus which calculates a safe distance. Further, the apparatus disclosed in WO 2018/115963 A calculates a potential accident responsibility value based on the safe distance. The potential accident responsibility value is a value indicating a degree of responsibility of own vehicle when an accident occurs between the own vehicle and a peripheral vehicle. In WO 2018/115963 A, a block that determines the potential accident responsibility value calculates, in a previous stage, the potential accident responsibility value in a case where the own vehicle travels a planned route, and allows the control under a condition that the calculated potential accident responsibility value is within a controllable range. The disclosure of WO 2018/115963 A is incorporated herein by reference.

The technique disclosed in WO 2018/115963 A does not change a determination rule of the autonomous driving control corresponding to a change in traveling situation. Therefore, there is a need for an apparatus that determines whether the autonomous driving control is appropriate corresponding to the change in traveling situation.

In the present disclosure, an autonomous driving apparatus according to another aspect is used in a vehicle capable of performing an autonomous driving, and includes: a control execution determination unit permitting a course change of the subject vehicle under a condition that an inter-vehicle distance between the subject vehicle and a peripheral vehicle existing around the subject vehicle is longer than a minimum control permission distance; and a minimum distance determination unit configured to select, corresponding to a traveling situation of the subject vehicle, one relationship from multiple relationships which define minimum control permission distances corresponding to respective traveling situations, and determine the minimum control permission distance to be used by the control execution determination unit using the one selected relationship.

The autonomous driving apparatus determines the minimum control permission distance to be used by the control execution determination unit corresponding to the traveling situation in which the subject vehicle travels. Therefore, it is possible to shorten the minimum control permission distance in a traveling situation where inconvenience is unlikely to occur even though the inter-vehicle distance is shortened. Further, it is possible to determine whether the autonomous driving control is appropriate corresponding to the change occurred in the traveling situation.

The above autonomous driving apparatus may further include: a deviation value determination unit determining a deviation value for each of one or more candidate routes based on a comparison result between the inter-vehicle distance and the minimum control permission distance. The deviation value indicates a possibility of the subject vehicle deviating from a traveling rule in a case where the subject vehicle travels along the corresponding candidate route. The one or more candidate routes are planned by a route planning unit such that each of the one or more candidate routes enables the subject vehicle to continue traveling. The control execution determination unit determines, from the one or more candidate routes planned by the route planning unit, one candidate route having the deviation value within a control permission range as a target route of the subject vehicle, and outputs an instruction for controlling the subject vehicle to travel along the selected target route to a traveling unit, which executes a traveling control of the subject vehicle.

In the above autonomous driving apparatus, the traveling situation includes a standard traveling situation and a specific course change situation. The specific course change situation is determined under conditions that: (i) a travel plan route to a destination of the subject vehicle includes a section that requires a course change and (ii) a possibility indicating that the inter-vehicle distance within the section, which requires the course change, becomes longer than a standard minimum control permission distance, which is determined based on a relationship corresponding to the standard traveling situation, is lower than a predetermined threshold value.

In the above autonomous driving apparatus, the specific course change situation is determined further under a condition that a traveling lane to be traveled by the subject vehicle after the course change is determined to be in a congested state while the subject vehicle travels in the section that requires the course change.

In the above autonomous driving apparatus, the minimum distance determination unit selects, corresponding to a current position of the subject vehicle, one relationship from the multiple relationships which define the minimum control permission distances corresponding to respective traveling situations, and determines the minimum control permission distance to be used by the control execution determination unit using the one selected relationship.

The above autonomous driving apparatus may further include a rule acquiring unit acquiring a determination rule of the deviation value corresponding to the traveling situation of the subject vehicle. The deviation value determination unit determines the deviation value based on the determination rule acquired by the rule acquiring unit.

In the above autonomous driving apparatus, the rule acquiring unit acquires the determination rule of the deviation value corresponding to a traveling area in which the subject vehicle is traveling, and the determination rule of the deviation value corresponding to a country is acquired as the determination rule of the deviation value corresponding to the traveling area.

In the above autonomous driving apparatus, the multiple relationships which define the minimum control permission distances corresponding to respective traveling situations are learned by a server, and the rule acquiring unit acquires, from the server, the one relationship that defines the minimum control permission distance corresponding to the traveling situation of the subject vehicle.

The above autonomous driving apparatus may further include a notification control unit that outputs, via a notification unit, a notification which indicates an autonomous driving control is highly likely to unavailable under conditions that (i) the travel plan route includes the section that requires the course change and (ii) the possibility indicating that the inter-vehicle distance within the section, which requires the course change, becomes longer than the minimum control permission distance is lower than a predetermined notification threshold value.

The above autonomous driving apparatus may further include a confirmation control unit confirming, to an occupant of the subject vehicle, about a change of the minimum control permission distance corresponding to the traveling situation in a case where (i) the travel plan route includes the section that requires the course change, (ii) a possibility indicating that the inter-vehicle distance within the section, which requires the course change, becomes longer than the standard minimum control permission distance, which is determined based on the relationship corresponding to the standard traveling situation, is lower than a first predetermined threshold value, and (iii) a possibility indicating that the inter-vehicle distance within the section, which requires the course change, becomes longer than the minimum control permission distance determined by the minimum distance determination unit is higher than a second predetermined threshold value. The second predetermined threshold value is set to be equal to or higher than the first predetermined threshold value.

In the present disclosure, an autonomous driving apparatus according to another aspect is used in a vehicle capable of performing an autonomous driving, and includes: a deviation value determination unit determining a deviation value of each of one or more candidate routes based on a comparison result between an inter-vehicle distance and a minimum control permission distance, the inter-vehicle distance being a distance between the subject vehicle and a peripheral vehicle existing around the subject vehicle, the deviation value indicating a possibility of the subject vehicle deviating from a traveling rule in a case where the subject vehicle travels along the corresponding candidate route, the one or more candidate routes being planned by a route planning unit such that each of the one or more candidate routes enables the subject vehicle to continue traveling; a control execution determination unit selecting, from the one or more candidate routes, one candidate route having the deviation value within a control permission range as a target route of the subject vehicle, and outputting an instruction for controlling the subject vehicle to travel along the selected target route to a traveling unit, which executes a traveling control of the subject vehicle; and a rule update unit updating a determination rule of the deviation value, which is used by the deviation value determination unit to determine the deviation value, in response to a change in a sensor, which detects a behavior of at least one of the subject vehicle or the peripheral vehicle.

In the above autonomous driving apparatus, when the sensor is changed, the rule update unit updates the rule used for determining the deviation value. Thus, it is possible to determine the deviation value so that the deviation value reflects the change in the sensor. Then, the control execution determination unit selects the target route based on the deviation value determined by the updated rule. Thus, even when the sensor is changed, the autonomous driving apparatus can determine whether the traveling of selected route is under an appropriate autonomous driving control.

In the present disclosure, an autonomous driving apparatus according to another aspect is used in a vehicle capable of performing an autonomous driving, and includes: a rule determination unit determining whether the subject vehicle travels according to a traveling rule in a case where the subject vehicle travels along each of one or more candidate routes, which are planned by a route planning unit such that each of the one or more candidate routes enables the subject vehicle to continue traveling; a rule management unit managing the traveling rule to be used by the rule determination unit corresponding to a traveling situation; and a rule update unit updating the traveling rule to be used by the rule determination unit corresponding to the traveling situation. In the present disclosure, a rule determination apparatus according to another aspect includes: a rule determination unit determining whether a subject vehicle to which an autonomous driving apparatus is mounted travels according to a traveling rule in a case where the subject vehicle travels along each of one or more candidate routes, which are planned by a route planning unit such that each of the one or more candidate routes enables the subject vehicle to continue traveling; and a rule update unit updating, corresponding to a traveling situation, the traveling rule used in the determining executed by the rule determination unit.

The above-described autonomous driving apparatus and the rule determination apparatus determine whether the subject vehicle travels according to the traveling rule. The traveling rule is set corresponding to the traveling situation of the subject vehicle. Therefore, it is possible to determine whether the autonomous driving control is appropriate corresponding to the change in the traveling situation.

In the present disclosure, an autonomous driving method according to another aspect is used in a vehicle capable of performing an autonomous driving, and includes: permitting a course change of the subject vehicle when an inter-vehicle distance between the subject vehicle and a peripheral vehicle existing around the subject vehicle is longer than a minimum control permission distance; selecting, corresponding to a traveling situation of the subject vehicle, one relationship from multiple relationships which define minimum control permission distances corresponding to respective traveling situations; and determining, using the one selected relationship, the minimum control permission distance to be used in a determination of permitting the course change.

In the present disclosure, an autonomous driving method according to another aspect is used in a vehicle capable of performing an autonomous driving, and includes: planning one or more candidate routes such that each of the one or more candidate routes enables the subject vehicle to continue traveling; determining a deviation value of each of the one or more candidate routes based on a comparison result between an inter-vehicle distance and a minimum control permission distance, the inter-vehicle distance being a distance between the subject vehicle and a peripheral vehicle existing around the subject vehicle, the deviation value indicating a possibility of the subject vehicle deviating from a traveling rule in a case where the subject vehicle travels along the corresponding candidate route; performing a traveling control of the subject vehicle; selecting, from the one or more candidate routes, one candidate route having the deviation value within a control permission range as a target route of the subject vehicle; outputting an instruction for controlling the subject vehicle to travel along the selected target route; and updating a determination rule of the deviation value in response to a change in a sensor, which detects a behavior of at least one of the subject vehicle or the peripheral vehicle.

In the present disclosure, a rule determination method according to another aspect includes: determining whether a subject vehicle to which an autonomous driving apparatus is mounted travels according to a traveling rule in a case where the subject vehicle travels along each of one or more candidate routes that enable the subject vehicle to continue traveling; and updating the traveling rule corresponding to a traveling situation.

First Embodiment

The following will describe embodiments of the present disclosure with reference to the drawings. In a manual driving of a vehicle by a driver, the driver may change an inter-vehicle distance corresponding to a traveling area. For example, when a road ahead of a junction is congested, the vehicle may join the road ahead of the junction with a shorter inter-vehicle distance than a normal inter-vehicle distance. This is because, in order to join the road ahead of the junction, the driver has to reduce the inter-vehicle distance to be shorter than the normal inter-vehicle distance.

A driver of a vehicle that currently travels on the road ahead of the junction is also aware of that in a case where the road is congested, the vehicle plans to join the road ahead of the junction may enter the road ahead of the junction with a shorter inter-vehicle distance. Therefore, it is allowable for the vehicle plans to join the road ahead of the junction to enter the road ahead of the junction with a shorter inter-vehicle distance. In other words, an area around the junction corresponds to an area where a short inter-vehicle distance is allowed.

In a case where a vehicle driving control is performed with consideration of a minimum value of inter-vehicle distance for which a rout change control is allowed (hereinafter referred to as a minimum control permission distance), when the above-mentioned congestion situation in the junction area is not taken into consideration, the vehicle in the autonomous driving state may stop driving without entering the road ahead of the junction.

When the vehicle performs a lane change to a target lane, which is congested, in a manual driving state, an intention of lane change to the target lane is indicated by turning on a direction indicator, and then the driver gradually performs the driving operation for lane change. Thus, another vehicle originally traveling in the target lane can be clearly notified of the lane change of subject vehicle. Another vehicle traveling in the target lane may slow down for helping the subject vehicle to move from the current lane to the target lane, thereby joining the target lane by lane change. In such a situation, even though the inter-vehicle distance is short, inconvenience is unlikely to occur. As described above, even though the inter-vehicle distance is short, inconvenience is unlikely to occur in some traveling situation. The traveling area is one of the traveling situation.

A deviation value, which is determined in consideration of the minimum control permission distance and indicates a possibility that an own vehicle deviates from a traveling rule, is not changed even in an above-described specific situation, the vehicle in the autonomous driving state may fail to change own route from the current traveling lane to the congested target lane. The autonomous driving apparatus 100 disclosed in the first embodiment is provided with consideration of the above-described difficulty.

FIG. 1 is a diagram showing a configuration of an autonomous driving apparatus 100 of a first embodiment of the present disclosure. The autonomous driving apparatus 100 is mounted on an own vehicle 1, which is also referred to as a subject vehicle. The own vehicle 1 is a vehicle on which the autonomous driving apparatus 100 is mounted when a certain autonomous driving apparatus 100 is set as a reference.

Under a condition that the vehicle travels on the road, the vehicle may be any type of vehicle without particular limitation. The vehicle may be an ordinary passenger car, a truck, or a bus. The autonomous driving apparatus 100 controls a behavior of the own vehicle 1. The behavior of vehicle may include a speed and a traveling direction. An autonomous driving method executed by the autonomous driving apparatus 100 is a vehicle control method corresponding to an autonomous driving level of three or higher.

The autonomous driving apparatus 100 includes a sensor unit 101, which includes one or more sensors. The sensor unit 101 detects a behavior of a peripheral vehicle, and outputs a sensor value indicating the behavior of peripheral vehicle. The sensor unit 101 may include a camera. In addition, the sensor unit 101 may include a millimeter-wave radar and LIDAR. FIG. 1 shows sensors 101a, 101b, and 101c as an example of the sensor unit 101. The number of sensors included in the sensor unit 101 shown in FIG. 1 is an example, and the number of sensors 101a, 101b, 101c is not limited to this example.

The sensor unit 101 also includes a sensor that detects a position of the own vehicle 1 and the behavior of the own vehicle 1. When the current position of the own vehicle 1 (hereinafter referred to as an own vehicle position) can be sequentially detected, the speed and the traveling direction of the own vehicle 1, which correspond to the behavior of the own vehicle 1, can be determined. Thus, under a condition that the sensor unit 101 includes the sensor which detects the position of own vehicle 1, it is not necessary to include a behavior sensor for directly detecting the behavior of own vehicle 1 in the sensor unit 101. The sensor unit 101 that detects the position of own vehicle may also include a GNSS receiver. The sensor unit 101 that detects the behavior of own vehicle 1 may include a vehicle speed sensor, a yaw rate sensor, an acceleration sensor, or the like.

The current position of own vehicle may be detected by comparing an environment shape around the own vehicle 1 detected by LIDAR with a high-precision map. In this configuration, the position of own vehicle 1 and the behavior of own vehicle 1 can be detected by the sensor unit 101 that detects the behavior of peripheral vehicles without a dedicated sensor 101 for detecting the position of own vehicle 1 and the behavior of own vehicle 1.

A map storage 120 stores a digital road map. The digital road map may be the above-mentioned high-precision map, or may be a normal road map that is not a high-precision map. The high-precision map also shows positions of road signs, such as lanes on the road, types and positions of road signs, and three-dimensional objects around the road. In the present disclosure, the storage may include a computer-readable tangible storage medium. As the storage medium, for example, a flash memory may be used.

A rule DB storage 130 stores a rule database (hereinafter referred to as a rule DB). The rule DB includes traveling rule of each traveling area. The traveling rule of each traveling area includes traffic directions, such as one-way traffic, speed limits, and designation of priority road and non-priority road.

The data of traveling rule can be referred to in a determination process executed by a control execution determination unit 173. The rule DB storage 130 includes a storage medium, such as RAM or ROM. When the determination process executed by the control execution determination unit 173 is performed by using a trained model including a neural network or the like, the traveling rule may be provided as teaching data to be used in the learning of the trained model.

The traveling rule may include at least one of a longitudinal speed rule, a lateral speed rule, a driving priority rule in a traveling direction, a traffic light rule, a traffic sign rule, and a route priority rule. The longitudinal direction is defined as a direction along the road surface or a front-rear direction of the vehicle. The lateral direction is defined as a width direction of the vehicle or a width direction of the road.

The traveling rule may include, in part or in whole, a local traffic rule so as to overlap partial or all of the above-descried rules, or as another rule. The traveling rule may be an element for implementing a driving policy. The driving policy may be defined as a strategy and rules that define a control behavior corresponding to the vehicle level. The driving policy may be defined as an implementation of a decision-making level of Vehicle Level Safety Strategy (VLSS). The traveling policy may be defined as a mapping from the detected state to the driving command.

A wireless communication unit 140 wirelessly communicates with an outside source positioned outside the own vehicle 1. The wireless communication unit 140 includes an antenna, which transmits and receives radio waves, and a communication circuit, which demodulates the radio waves received by the antenna and modulates the signals to be transmitted from the antenna. The wireless communication unit 140 performs wireless communication with a server 2 positioned outside the own vehicle 1. A wireless communication system may be a wide area wireless communication system including base stations and a public communication network.

A sensor integration unit 150, a route planning unit 160, a rule determination unit 170, and a traveling unit 180 may be implemented by at least one processor. For example, a configuration corresponding to the sensor integration unit 150, the route planning unit 160, the rule determination unit 170, and the traveling unit 180 may be implemented by a computer including at least one processor, a non-volatile memory, RAM, I/O, and a bus connecting these components. The non-volatile memory may store a program for controlling the general-purpose computer to function as the sensor integration unit 150, the route planning unit 160, the rule determination unit 170, and the traveling unit 180. The processor executes the program stored in the non-volatile memory by using a temporary memory function of the RAM, thereby the computer functioning as the sensor integration unit 150, the route planning unit 160, the rule determination unit 170, and the traveling unit 180. Execution of these functions indicates execution of a vehicle control method corresponding to the program.

The sensor integration unit 150, the route planning unit 160, the rule determination unit 170, and the traveling unit 180 may be implemented by respective processors. Alternatively, the sensor integration unit 150, the route planning unit 160, the rule determination unit 170, and the traveling unit 180 may be implemented by a configuration including three or less processors.

The sensor unit 101 outputs a sensor value, and the sensor value is input to the sensor integration unit 150. The sensor integration unit 150 includes a target vehicle behavior determination unit 151, a position acquiring unit 152, an environment determination unit 153, and a rule acquiring unit 154.

The target vehicle behavior determination unit 151 acquires the sensor value output from the sensor unit 101. Then, a relative behavior Vstate of the target vehicle is sequentially determined based on the acquired sensor value.

The target vehicle is selected from the peripheral vehicles existing around the own vehicle 1. Existence of peripheral vehicles around the own vehicle 1 may be determined, for example, by determining whether the peripheral vehicle is located within a predetermined peripheral region defined with respect to the own vehicle 1. The peripheral region may be a rectangular region centered on the own vehicle 1, and may have sides parallel to the front-rear direction and a left-right direction of the own vehicle. A size of the rectangle peripheral region may be set such that a distance from the own vehicle to a side along a front direction of the vehicle is approximately equal to a stop distance of the vehicle. A distance from the own vehicle to a side along a rear direction of the vehicle may be set the same as the distance in the front direction of the vehicle, or may be shorter than the distance in the front direction of the vehicle. The size of the rectangle in the left-right direction of the vehicle may be set to a width of one lane. The size of the peripheral region may be set in various different ways. A shape of the peripheral region may be set in various different ways. For example, the shape of the peripheral region may be a perfect circle or an ellipse.

The target vehicle is defined as a vehicle (also referred to as a different vehicle) existing in the peripheral region of the own vehicle 1 and another different vehicle does not exist between the own vehicle and the different vehicle. In another example, the target vehicle may be defined as a vehicle (also referred to as a different vehicle) existing in the peripheral region of the own vehicle 1 although another different vehicle existing between the own vehicle and the different vehicle.

The relative behavior Vstate includes a relative position and a relative speed. The relative position can be represented by a relative distance and a relative orientation. The relative behavior Vstate may be determined based on changes in the position of the own vehicle 1 and the position of the target vehicle. The position of the target vehicle may be detected by the sensor unit 101 mounted on the target vehicle, and the position of the target vehicle may be acquired by the autonomous driving apparatus 100 of the own vehicle 1 by wireless communication. In this case, the target vehicle behavior determination unit 151 acquires the sensor value detected by the sensor unit 101 mounted on the target vehicle, and determines the relative behavior Vstate of the target vehicle relative to the own vehicle based on the acquired sensor value.

The position acquiring unit 152 acquires the sensor value and sequentially determines the current position of the own vehicle 1, that is, the own vehicle position based on the acquired sensor value.

The environment determination unit 153 determines the environment around the own vehicle 1 based on the acquired sensor value. The environment includes a shape of the road on which the own vehicle 1 is traveling. The road shape includes road widths, road slopes, road curvatures, road lane markings, and the like. The environment around the own vehicle 1 may include information on obstacles existing around the own vehicle 1 in addition to the road condition and the peripheral vehicles.

The rule acquiring unit 154 acquires the traveling rule at the current vehicle position from the rule DB storage 130. The traveling rule includes the rule of each traveling area and a rule that does not depend on the traveling area. The rule may be a rule for determining a deviation value ALval.

The rule for determining the deviation value ALval includes a traffic rule. Hereinafter, the rule for determining the deviation value ALval may be simply described as a rule. Traffic rule is defined by laws and regulations. In order to acquire the traffic rule of each traveling area, the rule acquiring unit 154 specifies the own vehicle position on the currently traveling road based on the own vehicle position specified based on the sensor value and road map stored in the map storage 120. Then, the traffic rule determined corresponding to the specified own vehicle position on the traveling road is acquired from the rule DB storage 130. The traffic rule acquired from the rule DB storage 130 includes a traffic rule applied to an area around the own vehicle position and including the own vehicle position (hereinafter referred to as a peripheral traffic rule Rdb).

The reason for acquiring the peripheral traffic rule Rdb is to prevent the traffic rule from being frequently acquired from the rule DB storage 130 every time the own vehicle position changes. An example of the peripheral traffic rule Rdb is a speed limit applied to the own vehicle position and a road around the own vehicle position. The traffic rule acquired by the rule acquiring unit 154 from the rule DB storage 130 includes a country specific traffic rule. Traffic rule is differ from country to country, such as a meaning of road markings differs from country to country. Therefore, the rule acquiring unit 154 also acquires the traffic rule corresponding to the country.

The rule that does not depend on the traveling area includes, for example, a rule that permission or forbidding of driving corresponding to a color of signal light. The rule that does not depend on the traveling area may also be stored in a predetermined storage area of the rule DB storage 130. Hereinafter, the peripheral traffic rule Rdb refers to the traffic rule, which is applied to the own vehicle position and the area around the own vehicle position, and the rule that does not depend on the traveling area.

The rule further includes a rule that the distance between vehicles is required to be keep at least the minimum control permission distance. The minimum control permission distance is a rule of the inter-vehicle distance that is required to be maintained. The minimum control permission distance can be defined in two directions, the minimum control permission distance in the longitudinal direction of the own vehicle 1 and the minimum control permission distance in the lateral direction of the own vehicle 1. The minimum control permission distance may be simply set as a distance required for the own vehicle so that the own vehicle 1 does not approach too close to an obstacle such as the different vehicle. Instead of simply setting the minimum control permission distance as a distance for avoiding an excessive approach to the obstacle, the minimum control permission distance may be set to a distance that includes a margin to allow the own vehicle 1 and the different vehicle to continue traveling corresponding to any changes in the behavior of different vehicles around the own vehicle and the different vehicle.

When the actual inter-vehicle distance of the own vehicle 1 becomes equal to or shorter than the minimum control permission distance, the autonomous driving apparatus 100 immediately increases the inter-vehicle distance to be longer than the minimum control permission distance during the autonomous driving state. That is, the autonomous driving apparatus 100 does not permit the vehicle control in which the inter-vehicle distance decreases to be equal to or less than the minimum control permission distance.

The minimum control permission distance is not always constant. The minimum control permission distance changes corresponding to the speed of the own vehicle 1 and the speed of peripheral vehicle. The minimum control permission distance also varies corresponding to the traveling area. The traveling area includes a junction area including the junction. The minimum control permission distance is set shorter in the junction area than other traveling areas. In addition to a relatively narrow area, such as the junction area, the traveling area may include a relatively large area, such as a whole country. The rule acquiring unit 154 acquires a rule for determining the minimum control permission distance in the traveling area defined based on the own vehicle position.

The rule acquiring unit 154 periodically acquires rules from the server 2 via the wireless communication unit 140, and stores the acquired rules in the rule DB storage 130. The server 2 determines, by learning, rules for determining the minimum control permission distance for each traveling area. The rule acquiring unit 154 acquires the rule for determining the minimum control permission distance for each traveling area learned by the server 2.

The sensor integration unit 150 outputs sensor-based information S to the route planning unit 160 and the rule determination unit 170. The sensor-based information S includes the sensor value input to the sensor integration unit 150 and information that can be derived based on the sensor value input to the sensor integration unit 150. The information that can be derived based on the sensor value includes target vehicle information, the own vehicle position, and the traveling rule. The target vehicle information indicates the relative behavior Vstate of the peripheral vehicle determined by the target vehicle behavior determination unit 151 based on the sensor value, and also indicates the position and behavior of the own vehicle 1.

The route planning unit 160 sequentially plans candidate routes Ti (i=1, 2, 3 . . . ), which are short-term route candidates to be traveled by the own vehicle. The short-term route is a route for determining the control to be executed by the traveling unit 180. The traveling unit 180 controls an acceleration/deceleration and the traveling direction of the own vehicle 1. The short-term route defines the own vehicle 1 travels in which direction and at what speed in the next control cycle to be executed by the traveling unit 180. The short-term route also includes time information, and specifies at which position the own vehicle 1 should be located at a certain time.

The route planning unit 160 determines the candidate routes Ti based on the relative behavior of the peripheral vehicle, which is specified by the target vehicle behavior determination unit 151, and the environment around the own vehicle 1, which is determined by the environment determination unit 153. As described above, the candidate routes Ti are candidates of the short-term route. The short-term route is a route obtained by dividing a long-term route into multiple routes, and is a route capable of traveling along the long-term route while avoiding peripheral vehicles. Thus, the short-term route is a route for continuing traveling. The long-term route may be set to a route from the current position of the own vehicle to a destination. The destination may be set by an occupant of the own vehicle 1. The destination may be set as a point where the own vehicle 1 has traveled a certain distance along the currently traveling road.

The route planning unit 160 plans multiple candidate routes Ti. The candidate routes Ti are candidates of the short-term route instructed to the traveling unit 180. In a case where there are two routes for lane changes in order to avoid a preceding vehicle and the durations of the two routes for lane changes are different from one another, the two routes are set as different candidate routes Ti. As described above, the short-term route also includes the time information. For example, when both of the two candidate routes are straight traveling routes but the positions reached after $\Delta t$ seconds are different from one another, the two candidate routes are set as different candidate routes Ti. The number of candidate routes Ti planned by the route planning unit 160 is not particularly limited. The number of candidate routes Ti planned by the route planning unit 160 may vary depending on the situation. The route planning unit 160 may transmit the planned candidate routes Ti to the rule determination unit 170.

The rule determination unit 170 includes a deviation value determination unit 171, a control execution determination unit 173, a deviation value storage 174, and an output unit 175. The deviation value determination unit 171 estimates a possibility that the own vehicle 1 deviates from the traveling rule in a case where the own vehicle 1 travels each candidate route Ti planned by the route planning unit 160. This possibility is expressed by the deviation value ALval. The deviation value ALval relatively indicates a possibility that the own vehicle 1 deviates from the traveling rule compared with the target vehicle when the own vehicle and the target vehicle are considered. Based on a high possibility of deviating from the traveling, the deviation value determination unit predicts that the traveling rule will be significantly deviated. Therefore, the possibility of deviating from the traveling rule may correspond to a value indicating a degree of deviation from the traveling rule. In the present embodiment, the deviation value ALval becomes a smaller value as the degree of deviation from the traveling rule decreases. The deviation value ALval also corresponds to a value for determining whether the own vehicle 1 complies with the traveling rule while the own vehicle 1 travels on the candidate route Ti.

In a case where the own vehicle 1 travels on the candidate route Ti, the deviation value ALval may be determined by using, as one factor, a comparison result between the inter-vehicle distance between the own vehicle 1 and the peripheral vehicle and the minimum control permission distance. Since the minimum control permission distance changes corresponding to the traveling area and the environment, it is necessary to determine the minimum control permission distance sequentially. Thus, the deviation value determination unit 171 includes a minimum distance determination unit 172 that determines the minimum control permission distance.

The minimum distance determination unit 172 determines the minimum control permission distance of each traveling area using a specific relationship between the minimum control permission distance and other factors. This relationship is acquired by the rule acquiring unit 154 from the rule DB storage 130.

In the above relationship, the minimum control permission distance is determined based on the speed of the vehicle for which the minimum control permission distance is calculated, and can be expressed by, for example, a mathematical formula. The minimum control permission distance includes a minimum control permission distance to the preceding vehicle, that is, the minimum control permission distance in the longitudinal direction and a minimum control permission distance in the lateral direction. The rule acquiring unit 154 acquires the relationship for determining these two types of control permission minimum distances.

The deviation value ALval is determined based on, as one factor, a comparison result between the distance from the own vehicle to the preceding vehicle when the own vehicle 1 travels on the candidate route Ti and the longitudinal minimum control permission distance. As another factor considered in the determination of the deviation value ALval, there is a comparison result between the lateral inter-vehicle distance when the own vehicle 1 travels on the candidate route Ti and the lateral minimum control permission distance. The lateral direction may be the road width direction or the vehicle width direction of the own vehicle 1. Whether the route complies with the traffic rule applied to the own vehicle position is also a factor that affects the deviation value ALval.

A deviation value determination formula or a deviation value determination map for determining the deviation value ALval based on these factors may be defined and stored in advance. Hereinafter, the deviation value determination formula and the deviation value determination map are collectively referred to as a deviation value determination relationship. The deviation value determination unit 171 determines the deviation value ALval based on the deviation value determination relationship and the above-described factors.

The deviation value ALval is set to be decreased as the own vehicle 1 travels according to the traveling rule. For example, when the inter-vehicle distance is sufficiently secured, the deviation value ALval decreases to a small value. The deviation value ALval may increase when the own vehicle 1 suddenly accelerates. This is because a sudden acceleration increases the minimum control permission distance from the own vehicle to the preceding vehicle.

The traffic rule may be acquired by an acquiring method other than the acquisition from the rule DB storage 130. Specifically, the traffic rule at the current position may be acquired by analyzing images captured by a camera that captures a periphery of the own vehicle 1 and detecting a sign, a traffic light, a road marking, or the like.

The control execution determination unit 173 selects one route to be instructed to the traveling unit 180 from the candidate routes Ti planned by the route planning unit 160. Hereinafter, the route selected by the control execution determination unit is referred to as a selected route Tpassed. The selected route Tpassed is required to be a safe route Tsafe. The safe route Tsafe is a route that does not deviate from the traveling rule in relation to the target vehicle. When the selected route Tpassed is the safe route Tsafe, the autonomous driving control for traveling on the selected route Tsafe is permitted. When the selected route Tpassed is not the safe route Tsafe, the autonomous driving control is not permitted.

When the deviation value ALval of the candidate route, which is determined by the deviation value determination unit 171, is within a control permission range, the control execution determination unit 173 sets, as the safe route Tsafe, the candidate route Ti for which the deviation value ALval is determined. The control permission range is set as a range from 0 to a predetermined value at which the deviation value ALval indicates that the own vehicle 1 does not deviate from the traveling rule. Alternatively, the control permission range may be set to 0 only.

When the inter-vehicle distance is shorter than the minimum control permission distance, the deviation value ALval does not fall within the control permission range. Thus, when the inter-vehicle distance is shorter than the minimum control permission distance, controlling the own vehicle to travel on the candidate route Ti is not permitted. In a case where the candidate route Ti is a route for changing the course, for permitting the course change, the control execution determination unit 173 requires that the inter-vehicle distance should be longer than the minimum control permission distance.

In a case where no candidate route Ti whose deviation value ALval is within the control permission range exists, an emergency stop route Te is selected as the selected route Tpassed. The emergency stop route Te is a preset route, which decelerates the vehicle at a maximum deceleration without operating a steering wheel of the vehicle. The rule determination unit 170 outputs the selected route Tpassed to the traveling unit 180.

The deviation value storage 174 includes a writable non-volatile storage medium. The deviation value ALval is stored in the deviation value storage 174 together with the selected route Tpassed. The output unit 175 may be connected to an external device disposed outside the autonomous driving apparatus 100. The output unit 175 is configured to transmit and receive signals. The output unit 175 outputs the deviation value ALval stored in the deviation value storage 174 to the external device connected to the output unit 175.

The traveling unit 180 determines the traveling direction and speed of the own vehicle 1 for controlling the vehicle 1 to travel on the selected route Tpassed. Then, based on the determined traveling direction and speed, a steering actuator provided in the own vehicle 1 together with a driving force source and a braking device provided in the own vehicle 1 are controlled.

(Configuration of Server 2)

A server 2 communicates with the wireless communication unit 140 mounted on the vehicles. The server 2 is configured to learn the rule for determining the minimum control permission distance at various points. As a method of learning the rule for determining the minimum control permission distance, the server 2 may acquire positions at any proper time points from a probe vehicle. In addition to the positions, the server may acquire the peripheral images from the probe vehicle. The probe vehicle is configured to sequentially transmit, to the server 2, a position of the probe vehicle, or a peripheral image captured at a position of the probe vehicle together with the position of the probe vehicle.

In another example, a predetermined traveling area may be provided with a roadside device that captures images of the traveling area, and the server 2 may be configured to acquire the images taken by the roadside device. In this configuration, the server 2 analyzes the images acquired from the roadside device and determines the inter-vehicle distance in the traveling area.

In order to learn the rule for determining the minimum control permission distance, the server 2 specifically learns a relationship of the inter-vehicle distance, traveling speeds of the vehicles, and the number of vehicles included in per unit length of road. The number of vehicles included in per unit length of road indicates a busy level of the road. In the vicinity of the junction, when the road becomes congested, the course change for joining the road ahead of junction may be performed at a distance shorter than a normal inter-vehicle distance determined based on the traveling speed.

When the course change is not executed due to the reason that the actual inter-vehicle distance is shorter than the normal inter-vehicle distance, the vehicle traveling on the road for joining the junction may fail to continuation of traveling. Both of the driver of the vehicle traveling on the road for joining the junction and the driver of the vehicle traveling on the road to which another vehicle joins for entering the junction know the potential failure of continuation of traveling. Thus, even when the course change is executed with the actual inter-vehicle distance shorter than the normal inter-vehicle distance, inconvenience is unlikely to occur.

The server can learn that, depending on a situation of a traveling section, the course change may be executed at an inter-vehicle distance shorter than the normal inter-vehicle distance determined based on the traveling speed, and inconvenience is unlikely to occur in this situation. The inter-vehicle distance at which the course is changed in this situation is set as the minimum control permission distance. The server learns at what speed and inter-vehicle distance the vehicle changes the course under a condition of the number of vehicles included in per unit road length.

(Process Executed Before Transmission of Selected Route Tpassed)

Figure 2:
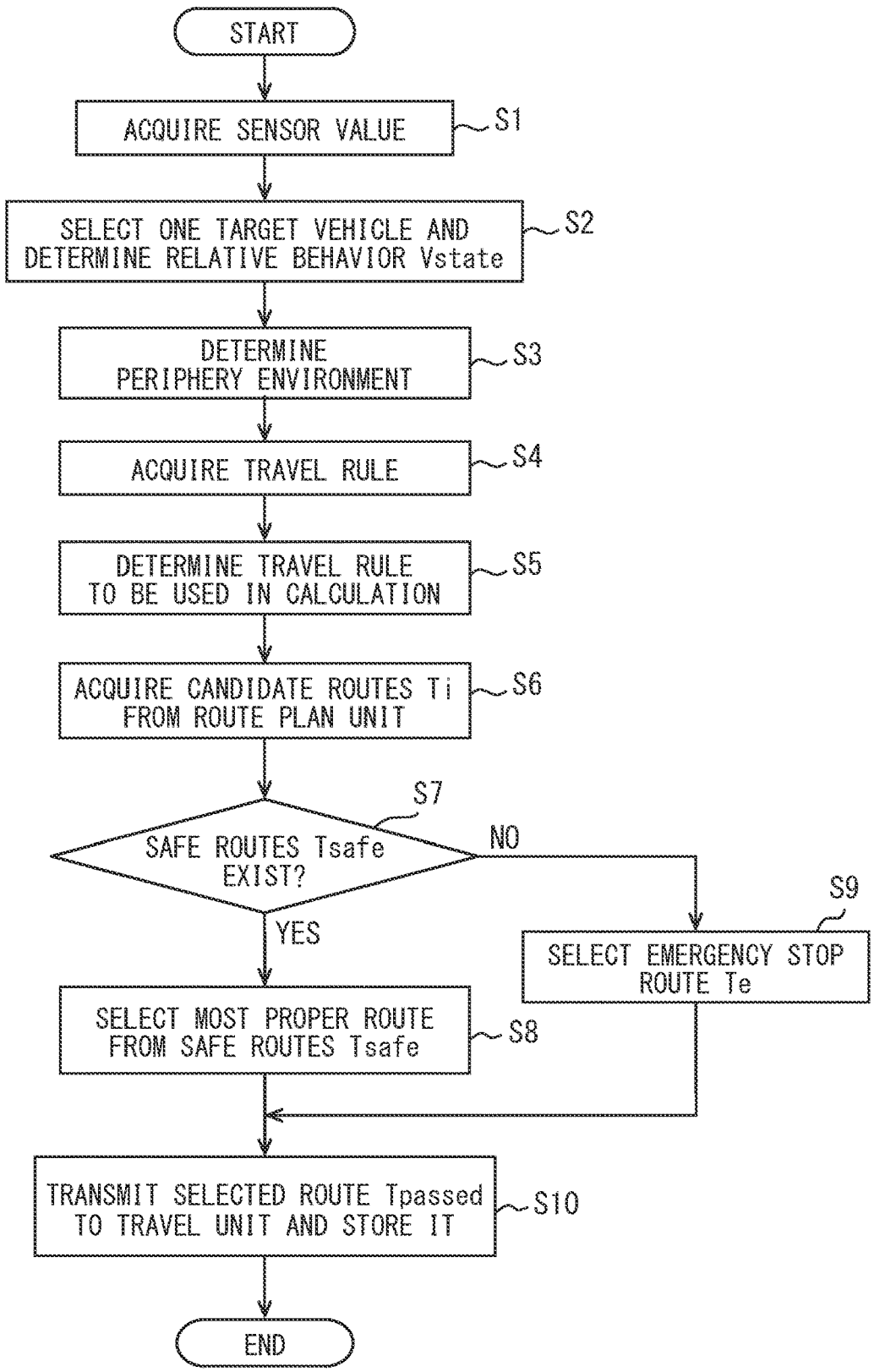
FIG. 2 is a diagram showing partial process executed by a route planning unit.

FIG. 2 shows a process executed before the route planning unit 160 transmits the selected route Tpassed to the traveling unit 180. The process shown in FIG. 2 is executed every execution cycle. The execution cycle is preset. The execution cycle may be arbitrarily set. For example, the execution cycle may be set to any period within a range of several tens of milliseconds to several hundreds of milliseconds.

In step (hereinafter, step is omitted) S1, the process acquires the sensor value from the sensor unit 101. The process in S1 is executed by the target vehicle behavior determination unit 151, the position acquiring unit 152, and the environment determination unit 153. In S1, the target vehicle behavior determination unit 151, the position acquiring unit 152, and the environment determination unit 153 acquire necessary sensor values.

The process in S2 is executed by the target vehicle behavior determination unit 151. In S2, one target vehicle is selected from peripheral vehicles of the own vehicle 1. The target vehicle selected in current process may be a vehicle different from the peripheral vehicles selected in the previous execution of the process in FIG. 2. However, when one peripheral vehicle requires special attention compared to other peripheral vehicles, a frequency of selecting the peripheral vehicle that requires special attention as the target vehicle may be set to be higher than that of another peripheral vehicle. In S2, the relative behavior Vstate of the target vehicle is determined based on the sensor value acquired in S1.

The process in S3 is executed by the environment determination unit 153. In S3, the peripheral environment of the own vehicle 1 is determined based on the sensor value acquired in S1.

The rule acquiring unit 154 executes the process in S4. In S4, the process acquires the traveling rules. As described above, the traveling rules include rules that differ depending on the traveling areas and the rule that does not depend on the traveling areas. When the rule that does not depend on the traveling areas has already been acquired, only the rules that differ depending on the traveling areas are acquired.

The rules that differ depending on the traveling areas include a peripheral traffic rule Rdb. The peripheral traffic rule Rdb acquires, from the rule DB storage 130, the peripheral traffic rule Rdb of the traveling area determined based on the own vehicle position. As described above, the own vehicle position is included in the sensor value acquired in S1.

The deviation value determination unit 171 executes the process in S5 and the subsequent process. In S5, the deviation value determination unit 171 acquires the traveling rule, which is acquired by the rule acquiring unit 154 in S4, and determines, based on the acquired traveling rule and the own vehicle position, the traveling rule to be used in the determination of deviation value ALval.

In S6, the candidate route Ti is acquired from the route planning unit 160. In S7, the process determines whether the candidate route Ti acquired in S6 includes the safe route Tsafe. As described above, the safe route Tsafe is a route that does not deviate from the traveling rule in relation to the target vehicle. The process determines whether each candidate route Ti is the safe route Tsafe by executing a subroutine process shown in FIG. 3. The process shown in FIG. 3 will be described later.

When the process determines that the candidates route include the safe route Tsafe, the process proceeds to S8. In S8, an optimum route is selected from the safe routes Tsafe included in the candidate routes. When only one safe route Tsafe exists, the only one safe route Tsafe is set as the optimum route. When there are multiple safe routes Tsafe, for example, the process selects the route that is most consistent with the long-term route as the optimum route.

When the process determine in S7 that there is no safe route Tsafe, the process proceeds to S9. The absence of safe route Tsafe indicates that the own vehicle 1 may be responsible for an occurrence of accident regardless of which candidate route Ti is selected. In this case, the process executes an emergency stop.

In S9, the process selects the emergency stop route Te. The emergency stop route Te of the present embodiment is a route for decelerating the own vehicle 1 at the maximum deceleration and stopping without operation of the steering wheel. In S10, the process transmits the route selected in S8 or S9, that is, the selected route Tpassed to the traveling unit 180. In S10, the deviation value ALval calculated for the selected route Tpassed and the selected route Tpassed are stored as a data set in the deviation value storage 174.

(Determination of Safe Route Tsafe)

Figure 3:
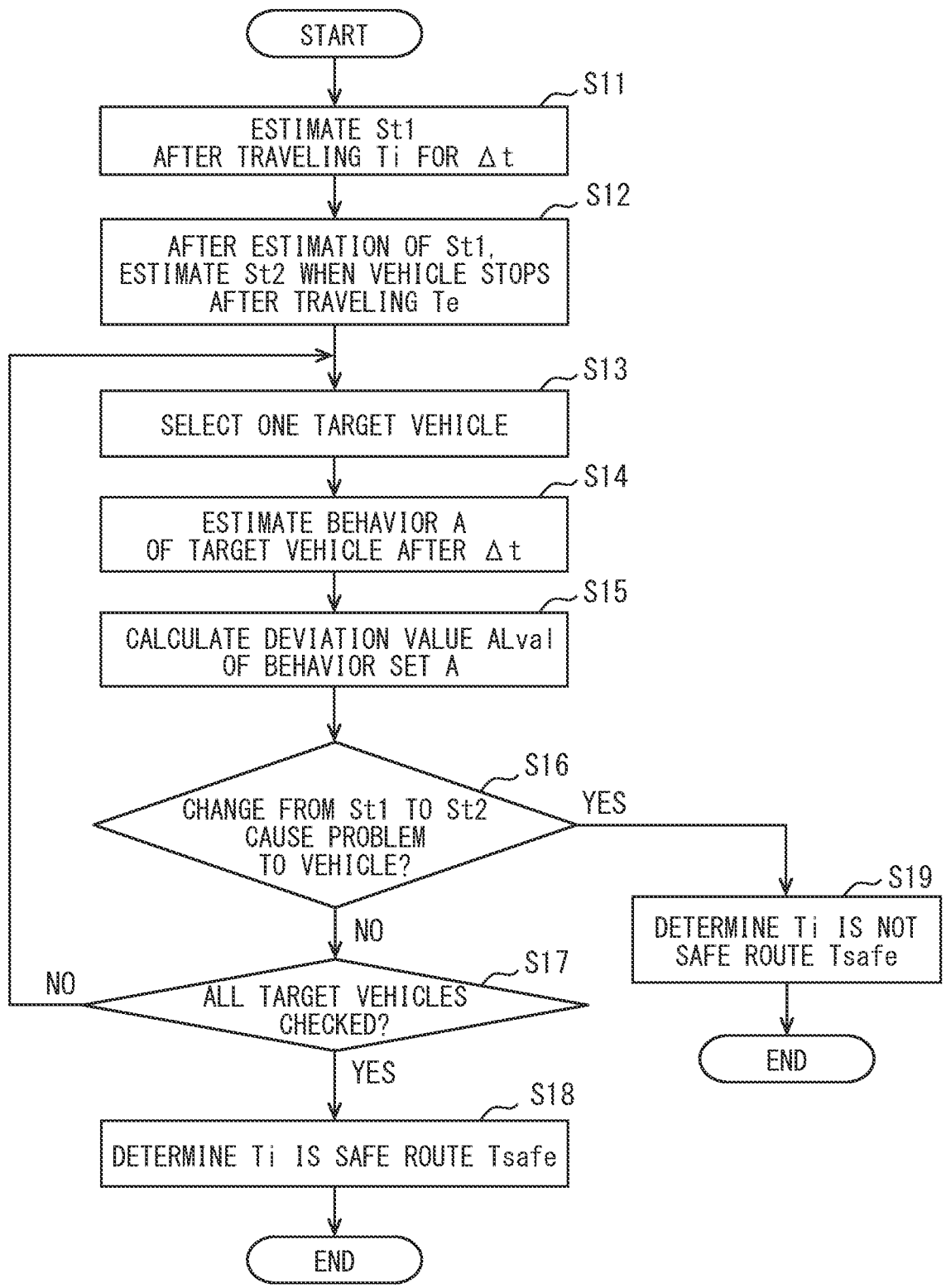
FIG. 3 is a diagram showing a process of determining whether each candidate route is a safe route.

FIG. 3 is a diagram showing a process of determining whether each candidate route Ti is the safe route Tsafe. In FIG. 3, the deviation value determination unit 171 executes the process in S11 to S17, and the control execution determination unit 173 executes the process in S18 and S19. The process shown in FIG. 3 is executed every time the candidate route Ti is acquired from the route planning unit 160, that is, every time S6 of FIG. 2 is executed. The process shown in FIG. 3 is executed for each candidate route Ti.

In S11, the process estimates the own vehicle state St1 after the own vehicle travels the candidate route Ti for $\Delta t$ seconds. The own vehicle state St1 includes at least the position and speed of the own vehicle 1. In S12, after the own vehicle state St1 is estimated in S11, the process estimates the own vehicle state St2 after the own vehicle 1 travels the emergency stop route Te and makes an emergency stop. In this case, since the own vehicle 1 is stopped, the own vehicle state St2 mainly indicates the position of the own vehicle 1.

In S13, one target vehicle is selected from peripheral vehicles of the own vehicle 1. The target vehicle selected here is a vehicle different from the peripheral vehicle already selected as the target vehicle. The target vehicle is selected from the peripheral vehicles existing around the own vehicle 1.

In S14, the process estimates a behavior set A that the target vehicle selected in S13 possibly take after elapse of Δt seconds. The behavior set A may include one or more tracks toward which the target vehicle possibly move in Δt seconds. The track can be represented by the positions of the target vehicle at multiple time points within the Δt seconds. Alternatively, the track may be represented by the latest position of the target vehicle at the execution time of S14, and the steering angle and speed of the target vehicle after the execution time of S14.

The possible range of the track heading direction may be a certain range on both of the left and right sides of the current traveling direction with respect to the current traveling direction of the target vehicle. This certain range may be set to be narrower as the speed of the target vehicle is higher. The behavior set A of the target vehicle can be determined from the target vehicle information.

In S15, the process calculates, for the behavior set A of the target vehicle determined in S14, the deviation value ALval during a state change of the own vehicle 1 from the own vehicle state St1 to the own vehicle state St2. In the calculation of the deviation value ALval, the minimum control permission distance is determined. The minimum control permission distance is determined by using one relationship selected, based on the position of the own vehicle, from the prepared determination relationships of the minimum control permission distances for respective traveling areas.

In S16, the process determines whether the change of own vehicle state from the own vehicle state St1 to the own vehicle state St2 causes a problem to the traveling of own vehicle by determining whether the state change of own vehicle affects the behavior set A of target vehicle determined in S14. Whether the traveling of own vehicle 1 causes a problem to the behavior set A is determined based on the deviation value ALval calculated in S15. When the deviation value ALval of own vehicle 1 corresponding to each track of the target vehicle indicated by the behavior set A indicates that the own vehicle 1 even partially deviates from the traveling rule, the process determines that the traveling of own vehicle 1 causes a problem to the behavior set A.

The deviation value ALval is determined based on a comparison result of the minimum control permission distance and the inter-vehicle distance, a determination result of whether the candidate route Ti conforms to the traffic rule, and the like. The deviation value ALval is determined for each candidate route for each preset time pitch.

Except when the deviation value ALval is equal to 0, it is assumed that the own vehicle 1 deviates from the traveling rule at least in part. That is, only when the deviation value ALval is equal to 0, it is considered that the own vehicle 1 does not deviate from the traveling rule.

The deviation value ALval for the behavior set A is determined for each track included in the behavior set A. When multiple deviation values ALval are determined corresponding to one behavior set A, the process determines whether the own vehicle 1 has a problem in traveling based on one deviation value ALval having the largest value among the multiple deviation values.

When the determination result of S16 is NO, the process proceeds to S17. In S17, the process determines whether all of the target vehicles have been checked, that is, whether the traveling of own vehicle 1 causes a problem to each of the target vehicles. When the determination result of S17 is NO, the process returns to S13. When the determination result of S17 is YES, the process proceeds to S18. In S18, the process determines that the candidate route Ti is the safe route Tsafe.

When the determination result of S16 is YES, the process proceeds to S19. In S19, the process determines that the candidate route Ti is not the safe route Tsafe. The existence of safe route Tsafe is determined in S7 as described above.

Summary of First Embodiment

The autonomous driving apparatus 100 of the first embodiment described above determines the minimum control permission distance corresponding to the traveling area in which the own vehicle 1 is traveling (S15). Since the minimum control permission distance is determined corresponding to the traveling area, the minimum control permission distance can be shortened in a traveling area where inconvenience is unlikely to occur, for example, a congested driving area where a shorter inter-vehicle distance is usually permissible during the manually driving state of the vehicle. By shortening the minimum control permission distance, it is possible to prevent a situation in which the vehicle finally makes a stop since the vehicle fails to continue the autonomous driving or the autonomous driving fails to change from the current lane to the target lane.

In the first embodiment, the deviation value ALval is calculated for each candidate route Ti based on the factor, which includes the comparison result of the minimum control permission distance and the inter-vehicle distance (S15). Then, the candidate route Ti, which has the deviation value ALval within the control permission range, is instructed to the traveling unit 180 as the target route, which the own vehicle 1 should travels along. The deviation value ALval relatively indicates the possibility that the own vehicle 1 deviates from the traveling rule in a relationship between the own vehicle 1 and each peripheral vehicle. Therefore, when a problem occurs between the own vehicle and the peripheral vehicle during the autonomous driving of own vehicle, since the own vehicle traveled the route which has the deviation value ALval within the control permission range, the traveling of own vehicle 1 is hardly determined to be not proper.

The deviation value determination unit 171 determines the deviation value ALval according to the traveling rule defined in each traveling area. Therefore, in a certain traveling area, the deviation value ALval can be determined with consideration of characteristics of the area. For example, in one traveling area, when the traveling of own vehicle 1 including a course change causes a problem to the traveling rule, the own vehicle 1 may have partial responsibility of the problem. However, in another traveling area, although the own vehicle 1 performs the same traveling, the own vehicle 1 may be considered to have no responsibility to the problem since the traveling rule is different. As a difference in rules due to such a difference in traveling areas, for example, there is a difference in the meanings of a lane marking. In addition to the rules stipulated by the law such as the meaning of lane marking, a difference in the rules due to the difference in the traveling areas may be the difference in the rules formed empirically.

In the present embodiment, the server 2 determines the rule for determining the minimum control permission distance corresponding to each traveling area by learning. The rule acquiring unit 154 acquires the rule for determining the minimum control permission distance corresponding to each traveling area learned by the server 2. Therefore, by determining the deviation value ALval determined based on the rule acquired by the rule acquiring unit 154 and selecting the route based on the determined deviation value ALval, the own vehicle 1 can continue traveling without making a stop more than necessary.

Second Embodiment

The following describes a second embodiment of the present disclosure. In the following description of the second embodiment, elements having the same reference symbols as those used so far are the same as the elements having the same reference symbols in the previous embodiment, except when specifically mentioned. When only a part of the configuration is described, the embodiment described above can be applied to other parts of the configuration.

Figure 4:
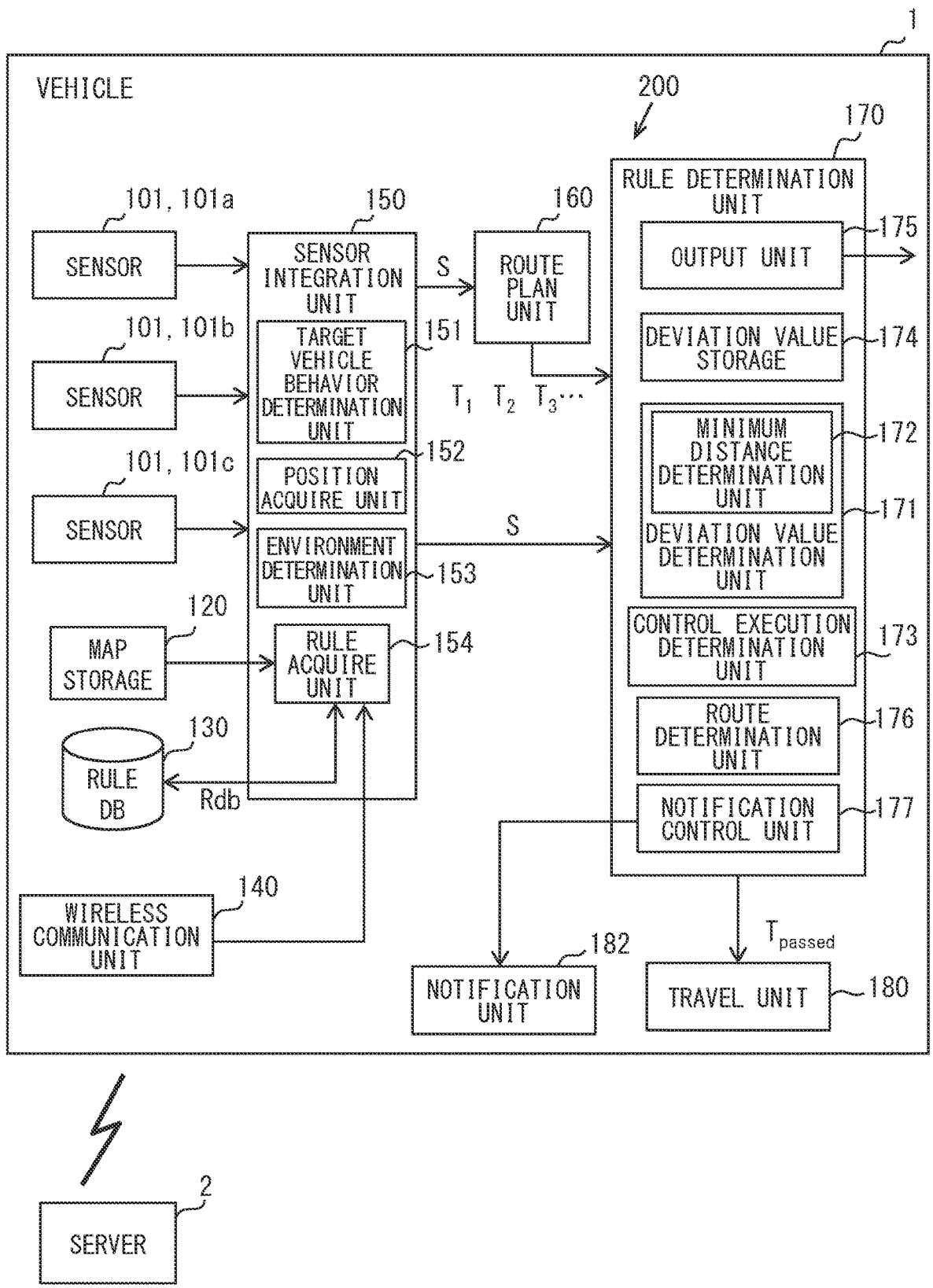
FIG. 4 is a diagram showing a configuration of an autonomous driving apparatus according to a second embodiment.

FIG. 4 shows a configuration of an autonomous driving apparatus 200 of the second embodiment. The autonomous driving apparatus 200 includes a route determination unit 176, a notification control unit 177, and a notification unit 182 in addition to the autonomous driving apparatus 100 according to the first embodiment.

The rule determination unit 170 includes the route determination unit 176 and the notification control unit 177. The route determination unit 176 sequentially determines a travel plan route, which the own vehicle 1 travels along for arriving at the destination. In the first embodiment, the travel plan route is the long-term route. Therefore, the travel plan route is longer than the candidate route Ti. In the present embodiment, the method of determining the travel plan route is the same as that of the long-term route. When a unit different from the route determination unit 176, such as the route planning unit 160 determines the travel plan route, the route determination unit 176 acquires the travel plan route from the unit that determines the travel plan route.

When the travel plan route determined by the route determination unit 176 includes a traveling section in which a possibility indicating that the inter-vehicle distance is likely to be shorter than the minimum control permission distance is higher than a notification threshold level, the notification control unit 177 notifies, via the notification unit 182, of that a possibility of the autonomous driving control of the vehicle becomes unavailable is high.

The notification unit 182 may be configured to include one or both of a display screen and a speaker. The notification unit 182 is provided in a passenger compartment of the own vehicle 1 at a position where the driver can recognize the notification performed by the notification unit 182.

Figure 5:
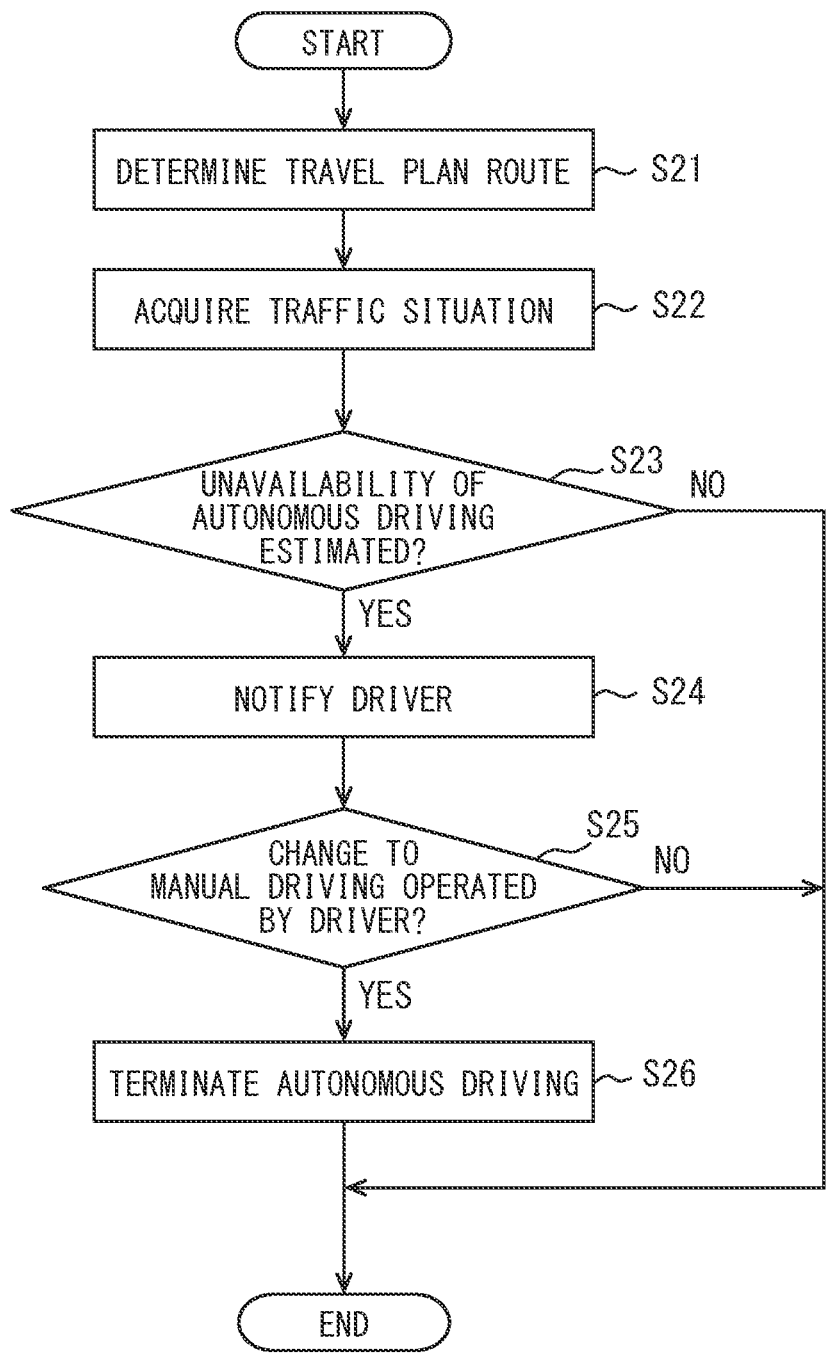
FIG. 5 is a diagram showing a process executed by a route determination unit and a notification control unit.

FIG. 5 shows a flowchart of the process executed by the route determination unit 176 and the notification control unit 177. In FIG. 5, the route determination unit 176 executes S21, and the notification control unit 177 executes S22 to S26. The process shown in FIG. 5 is repeatedly executed at regular intervals while the own vehicle 1 is in the autonomous driving state.

In S21, the process determines the travel plan route. In S22, the process acquires traffic condition when the vehicle plans to travel along the travel plan route determined in S21. The traffic condition is acquired from an external source via, for example, the wireless communication unit 140. The traffic condition includes traffic volume for each road section and for each time zone.

In S23, the process estimates whether the autonomous driving is unavailable under the traffic condition acquired in S22. The situation where the autonomous driving is estimated to be unavailable may include a situation where a possibility indicating that the actual inter-vehicle distance at a time of course change is longer than the minimum control permission distance is lower than the notification threshold level within a traveling section where the course change is required although the section has a heavy traffic volume. The distance determined by the minimum distance determination unit 172 is used as the minimum control permission distance.

In the autonomous driving, the possibility that the actual inter-vehicle distance is longer than the minimum control permission distance is low indicates that the course change cannot be performed. Herein, the course change includes joining to the road ahead of a junction.

When the determination result in S23 is NO, the process of FIG. 5 is terminated. When the determination result of S23 is YES, the process proceeds to S24. In S24, the notification unit 182 notifies, the driver of the own vehicle 1, of that the autonomous driving of own vehicle 1 is not available.

In S25, the process determines whether an operation for changing from the autonomous driving mode to the manual driving mode is made by the driver. When determination result in S25 is NO, the process of FIG. 5 is terminated. When the determination result in S25 is YES, the process proceeds to S26. In S26, the autonomous driving is terminated.

According to the second embodiment, when the autonomous driving is estimated to be unavailable (S23: YES), the driver is notified in advance (S24). By receiving the notification, the driver can know, in advance, that autonomous driving is going to be unavailable. Therefore, before the autonomous driving becomes unavailable, the driver can change the driving mode from the autonomous driving to the manual driving mode when it is easy for the driver to transfer the driving authority.

Third Embodiment

Figure 6:
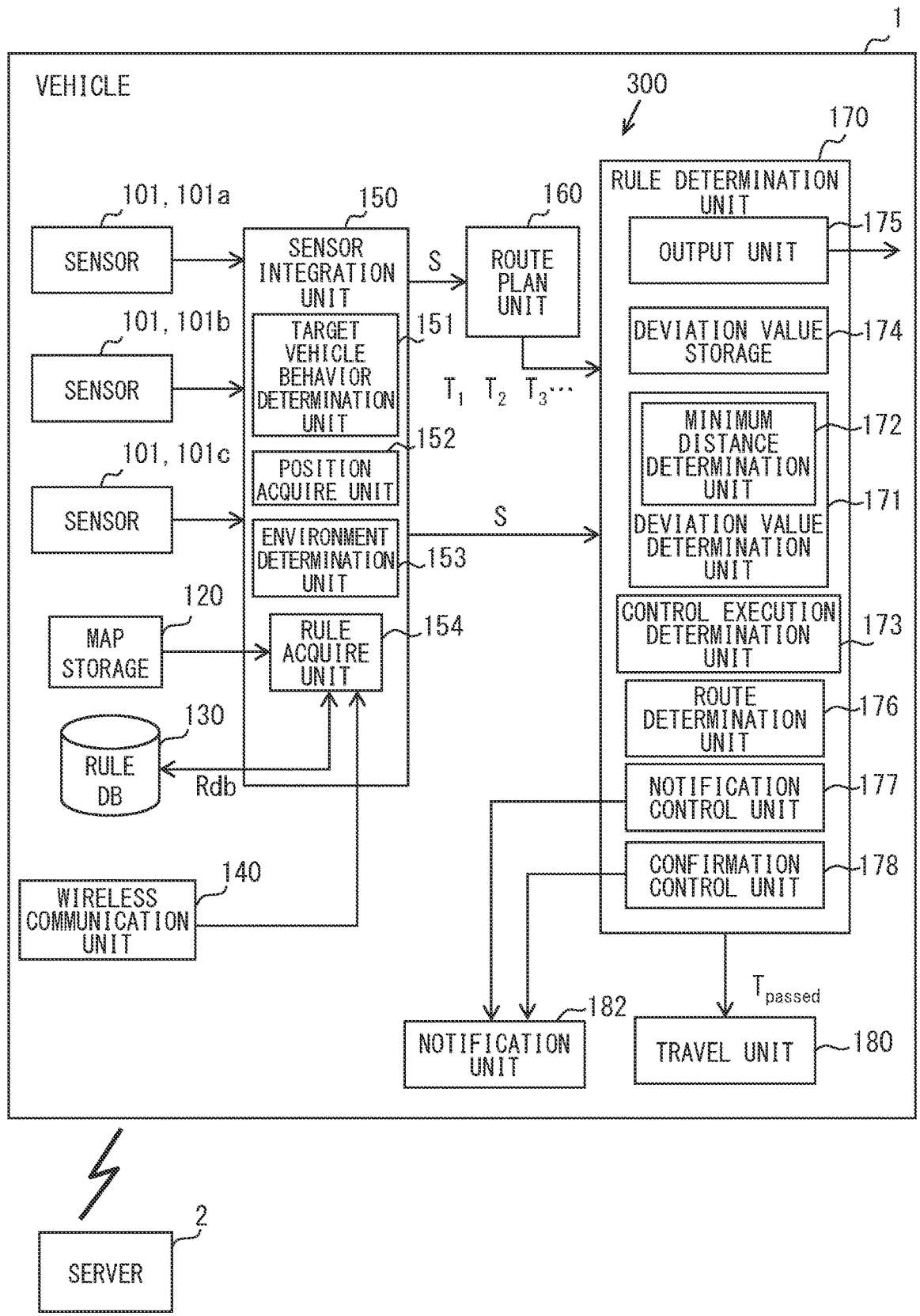
FIG. 6 is a diagram showing a configuration of an autonomous driving apparatus according to a third embodiment.

FIG. 6 shows a configuration of an autonomous driving apparatus 300 according to a third embodiment of the present disclosure. The autonomous driving apparatus 300 includes confirmation control unit 178 in addition to the autonomous driving apparatus 200 according to the second embodiment.

Figure 7:
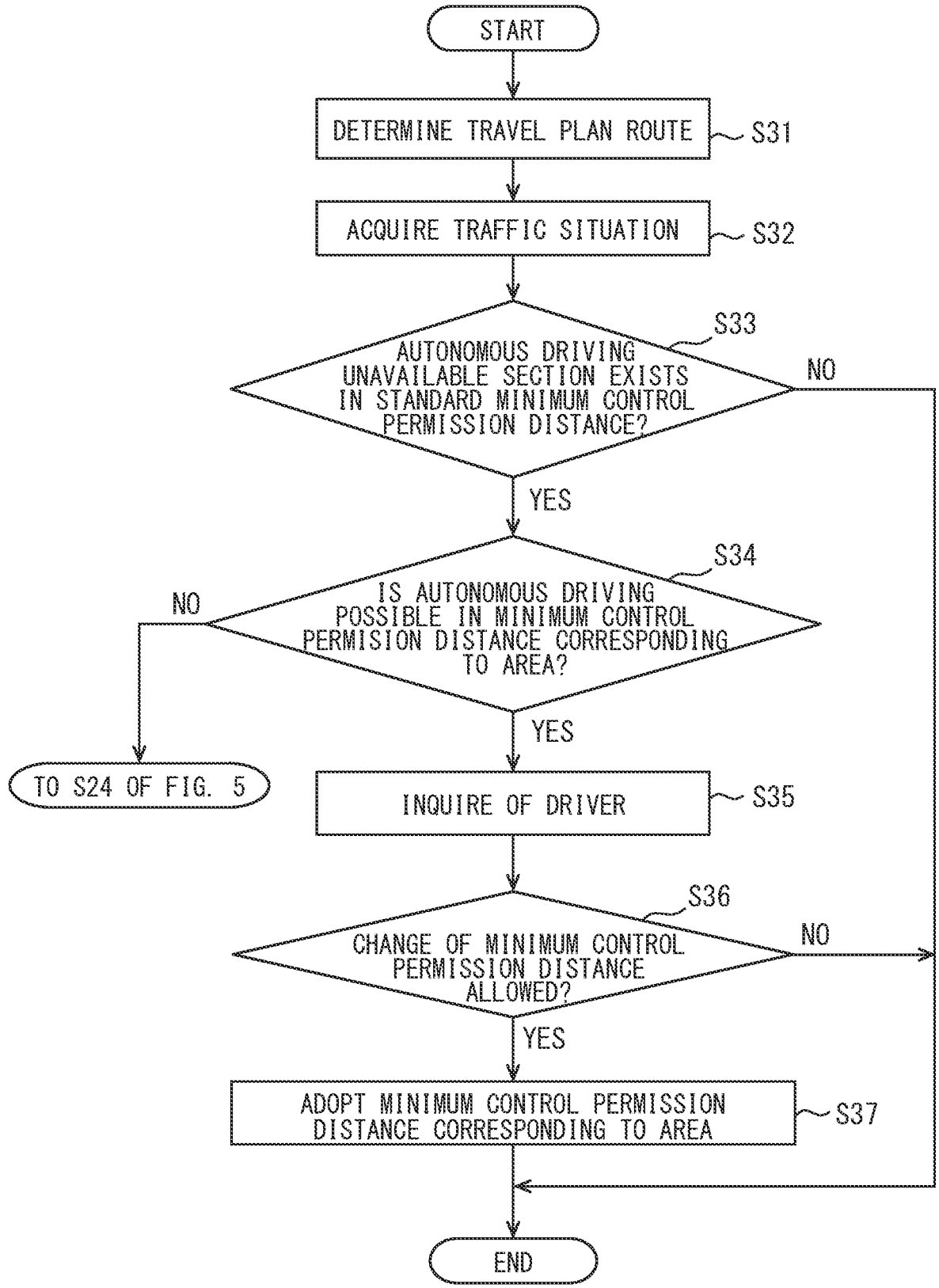
FIG. 7 is a diagram showing a process executed by a route determination unit and a confirmation control unit.

The confirmation control unit 178 will be described with reference to FIG. 7. FIG. 7 shows a process executed by the route determination unit 176 and the confirmation control unit 178. In FIG. 7, the route determination unit 176 executes the process in S31, and the confirmation control unit 178 executes the process in S32 to S37. The process shown in FIG. 7 is repeatedly executed at regular intervals while the own vehicle 1 is in the autonomous driving state.

The process in S31 is the same as that of S21, and determines the travel plan route. The process in S32 is the same as that of S22, and acquires the traffic condition when the vehicle plans to travel along the travel plan route determined in S31.

In S33, the process determines whether the traffic condition acquired in S32 includes a traveling area in which the autonomous driving is estimated to be unavailable under a standard minimum control permission distance. Specifically, for the traffic condition acquired in S32, the process determines whether a possibility, which indicates the inter-vehicle distance at a time of the course change is longer than the minimum control permission distance (that is, the standard minimum control permission distance) determined under a standard relationship to determine the minimum control permission distance, is lower than a first threshold value. The possibility, which indicates the inter-vehicle distance at a time of the course change is longer than the standard minimum control permission distance, is low indicates that the vehicle may fail to make the course change in the autonomous driving state with use of the standard minimum control permission distance. The standard relationship to determine the minimum control permission distance is a relationship that can determine the minimum control permission distance without depending on peculiarity of the traveling area.

When the determination result in S33 is NO, the process shown in FIG. 7 is terminated. When the determination result of S33 is YES, the process proceeds to S34. In S34, the process determines whether the autonomous driving is possible with the minimum control permission distance corresponding to the traveling area. Specifically, for the traffic condition acquired in S32, the process determines whether a possibility, which indicates the inter-vehicle distance at a time of the course change is longer than a minimum control permission distance (hereinafter referred to as an area-based minimum control permission distance) determined under a relationship to determine the minimum control permission distance corresponding to the traveling area, is higher than a second threshold value. The second threshold value is set to be equal to or higher than the first threshold value.

The possibility, which indicates the inter-vehicle distance at a time of the course change is longer than the area-based minimum control permission distance, is high enough indicates that the vehicle is possible to make the course change in the autonomous driving state with use of the area-based minimum control permission distance. The minimum distance determination unit 172 determines the area-based minimum control permission distance for each area. When the determination result of S34 is NO, the process determines that the autonomous driving is unavailable. Thus, the process proceeds to S24 of FIG. 5 and executes the subsequent process.

When the determination result of S34 is YES, the process proceeds to S35. In S35, the process inquires the occupant of own vehicle 1 about whether to permit the autonomous driving control in which the minimum control permission distance is changed. In S36, the process determines whether the occupant of own vehicle 1 permits the change of minimum control permission distance corresponding to each traveling area. The occupant of own vehicle 1 can indicate whether to permit the change of minimum control permission distance corresponding to each traveling area by operating a predetermined button provided in the vehicle, or the like.

When the determination result in S36 is NO, the process shown in FIG. 7 is terminated. When the determination result of S36 is YES, the process proceeds to S37. In S37, the autonomous driving is executed using the relationship of determining the area-based minimum control permission distance.

Summary of Third Embodiment

The confirmation control unit 178 determines whether a possibility, which indicates the inter-vehicle distance becomes longer than the standard minimum control permission distance within the traveling area that requires the course change and is included in the travel plan route determined by the route determination unit 176, is lower than the first threshold value (S33). When the above possibility is lower than the first threshold value, the confirmation control unit further determines whether the possibility, which indicates that the inter-vehicle distance becomes longer than the area-based minimum control permission distance, is higher than the second threshold value. When the confirmation control unit determines that the possibility, which indicates that the inter-vehicle distance becomes longer than the area-based minimum control permission distance, is higher than the second threshold value, the process inquires the occupant of own vehicle 1 about whether to change the minimum control permission distance to the area-based minimum control permission distance (S35).

The area-based minimum control permission distance is shorter than the standard minimum control permission distance. Therefore, some occupants may not prefer the autonomous driving control using the area-based minimum control permission distance. By inquiring the occupant whether to permit the autonomous driving control in which the minimum control permission distance is changed as described in the present embodiment, it is possible to prevent execution of the autonomous driving which the occupant of own vehicle does not like.

Fourth Embodiment

The autonomous driving vehicle obtains the situation around the own vehicle 1 by the sensor unit provided in the own vehicle 1. When there is a change in this sensor unit, the information obtained from the sensor unit may change. When the obtained information changes, it is possible that the travel plan route for which the traveling of vehicle is determined to deviate from the traveling rule based on the currently determined deviation value ALval, may be determined to not deviate from the traveling rule.

When the rule for determining the deviation value ALval is not changed even though the sensor unit is changed, the deviation value ALval is not changed to the value reflecting the change of sensor unit even though the sensor unit is changed. In this configuration, an appropriate autonomous driving control will not be performed.

Figure 8:
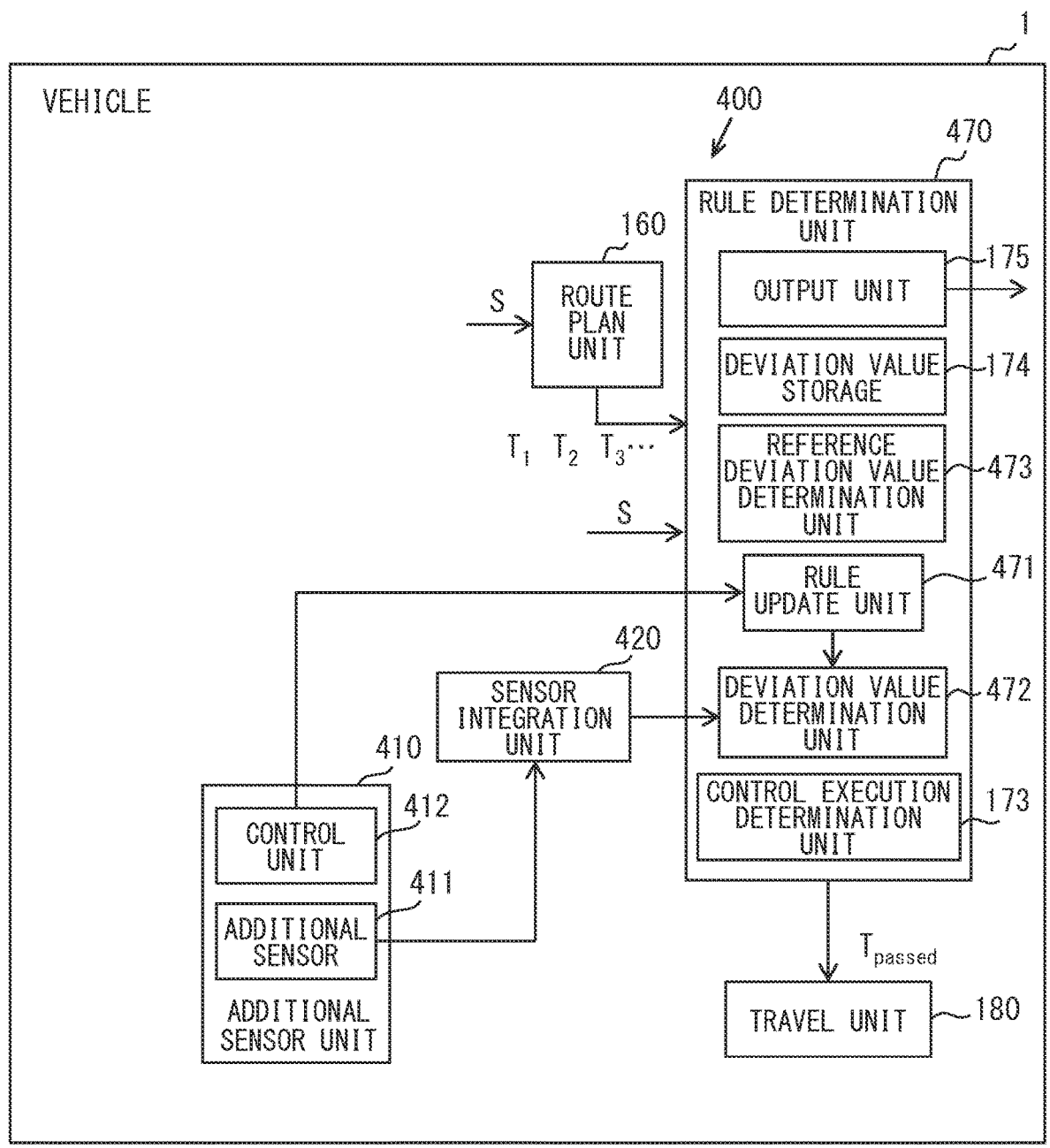
FIG. 8 is a diagram showing a configuration of an autonomous driving apparatus according to a fourth embodiment.

FIG. 8 shows a configuration of an autonomous driving apparatus 400 according to a fourth embodiment of the present disclosure. The autonomous driving apparatus 400 includes a rule determination unit 470 instead of the rule determination unit 170 of the first embodiment. The autonomous driving apparatus 400 includes an additional sensor unit 410 and a sensor integration unit 420. The autonomous driving apparatus 400 also includes a sensor unit 101, a map storage 120, a rule DB storage 130, a wireless communication unit 140, and a sensor integration unit 150. These components are omitted in FIG. 8 for convenience of illustration.

The additional sensor unit 410 is not an original component provided in the autonomous driving apparatus 400. The additional sensor unit 410 is added later in order to improve the autonomous driving apparatus 400 after the autonomous driving apparatus 400 is mounted on the own vehicle 1. The additional sensor unit 410 is, for example, made by a third party.

The additional sensor unit 410 includes an additional sensor 411 and a control unit 412. The additional sensor 411 detects a physical property value that can be used in determination of the deviation value ALval. Such physical property value includes a value that determines a behavior of at least one of the peripheral vehicle or the own vehicle 1. The additional sensor 411 outputs the detected value to the sensor integration unit 420.

The control unit 412 controls the additional sensor 411, and provides a rule update unit 471 with information for updating the rule for determining the deviation value ALval. The information is, for example, a type of the additional sensor 411, a mounting location of additional sensor 411, and the like. The control unit 412 may store the part of rule which is updated, and provides the rule update unit 471 with the stored part of rule which is updated.

The sensor integration unit 420 integrates the sensor value detected by the additional sensor 411 with the sensor value detected by the sensor unit 101. For example, when the sensor unit 101 and the additional sensor 411 detect the behaviors of the same object, the behavior of the object detected by the sensor unit 101 is averaged with the behavior of the object detected by the additional sensor 411 in order to determine one behavior of the object. The sensor integration unit 420 supplies the processing result to the deviation value determination unit 472 included in the rule determination unit 470.

The rule determination unit 470 includes the control execution determination unit 173, the deviation value storage 174, and the output unit 175 described in the foregoing embodiments. In addition, the rule determination unit 470 includes the rule update unit 471, the deviation value determination unit 472, and a reference deviation value determination unit 473.

The sensor-based information S described in the foregoing embodiments is input to the rule determination unit 470. The sensor-based information S is not affected by the additional sensor unit 410.

The rule update unit 471 updates the rule based on which the deviation value determination unit 472 determines the deviation value ALval corresponding to the information output from the control unit 412 of the additional sensor unit 410. By updating the rule, the deviation value determination unit 472 can determine the deviation value ALval that reflects the sensor value detected by the additional sensor 411. The rule update unit 471 is an example of a rule change unit.

The deviation value determination unit 472 applies the rule updated by the rule update unit 471, and determines the deviation value ALval based on the information provided by the sensor integration unit 420. Between the process executed by the deviation value determination unit 472 and the process executed by the deviation value determination unit 171, the rule for determining the deviation value and the information used for determining deviation value are different. In the process executed by the deviation value determination unit 472, the information for determining the deviation value is provided by the sensor integration unit 420. Remaining part of the process executed by the deviation value determination unit 472 and remaining part of the process executed by the deviation value determination unit 171 may be the same with one another. The deviation value determination unit 472 may set the rule for determining the minimum control permission distance as one of the rules which does not depend on the traveling area.

The reference deviation value determination unit 473 determines the deviation value ALval using the sensor-based information S. The reference deviation value determination unit 473 determines, using the sensor-based information S, the deviation value ALval according to the rule defined before an update by the rule update unit 471. In the present embodiment, the deviation value ALval determined by the reference deviation value determination unit 473 is stored in the deviation value storage 174. The deviation value ALval determined by the reference deviation value determination unit 473 is not provided to the control execution determination unit 173. Therefore, whether to execute the autonomous driving control is not determined based on the deviation value ALval determined by the reference deviation value determination unit 473.

The deviation value ALval determined by the reference deviation value determination unit 473 is a reference purpose deviation value ALval that is referred to when the deviation value ALval is compared between the own vehicle 1 and another vehicle. Even though the additional sensor 411 enables autonomous driving control with higher accuracy, the deviation value ALval calculated based on the rules established so far is used. This is because such deviation value ALval calculated based on the rules established so far may be better in certain cases. Therefore, in the present embodiment, the deviation value ALval calculated based on the rules established so far before change is stored in the deviation value storage 174 for comparing use purpose.

In the fourth embodiment, when the additional sensor unit 410 is added, the rule update unit 471 updates the rule for determining the deviation value ALval. Thus, it is possible to determine the deviation value ALval that reflects the addition of the additional sensor 411. Then, the control execution determination unit 173 determines the selected route Tpassed based on the deviation value ALval determined by the updated rule. Therefore, highly reliable autonomous driving control based on the deviation value ALval, which has improved reliability by the addition of the additional sensor unit 410, becomes possible.

Further, in the present embodiment, the reference deviation value determination unit 473 is also provided. Specifically, the deviation value ALval, which is determined using the rules before the change of rule is applied, is determined, and this deviation value ALval is stored in the deviation value storage 174 for reference purpose. Thus, the rules for determining the deviation value before the change or update by the rule update unit can be used for determining the reference purpose deviation value ALval.

Fifth Embodiment

Figure 9:
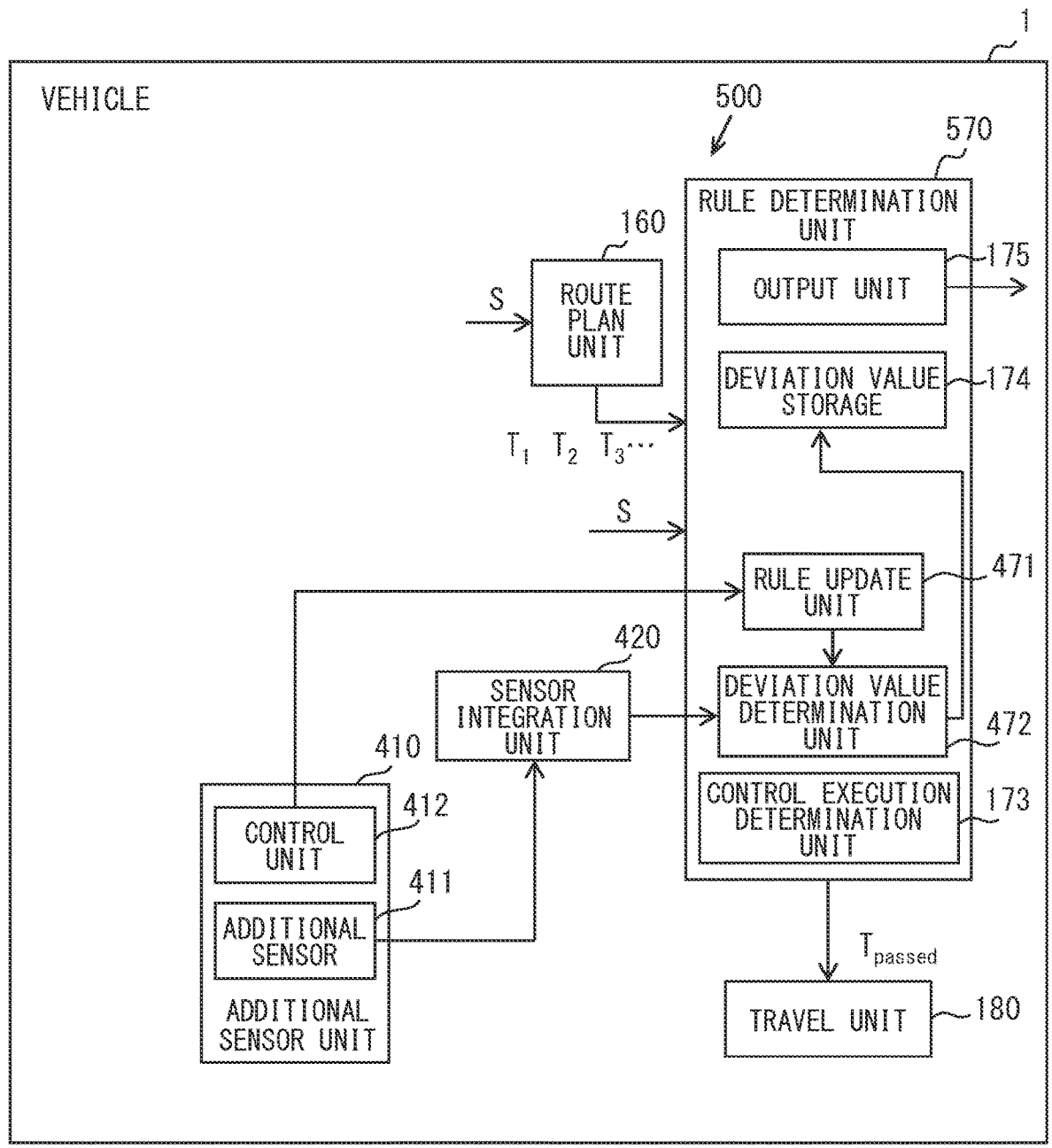
FIG. 9 is a diagram showing a configuration of an autonomous driving apparatus according to a fifth embodiment.

FIG. 9 shows a configuration of an autonomous driving apparatus 500 according to a fifth embodiment of the present disclosure. The autonomous driving apparatus 500 according to the present embodiment does not include the reference deviation value determination unit 473, which is included in the autonomous driving apparatus 400 according to the fourth embodiment. The deviation value ALval determined by the deviation value determination unit 472 is stored in the deviation value storage 174. The autonomous driving apparatus 500 of the present embodiment is different from the autonomous driving apparatus 400 according to the fourth embodiment only in above-described aspect.

As the autonomous driving apparatus 500, the deviation value ALval stored in the deviation value storage 174 may also be the deviation value ALval determined based on the updated rule.

According to the fifth embodiment, it is not necessary for the deviation value determination unit 472 and the reference deviation value determination unit 473 to periodically execute the process of determining the deviation value ALval during the traveling. Therefore, the processing load can be reduced.

Sixth Embodiment

Figure 10:
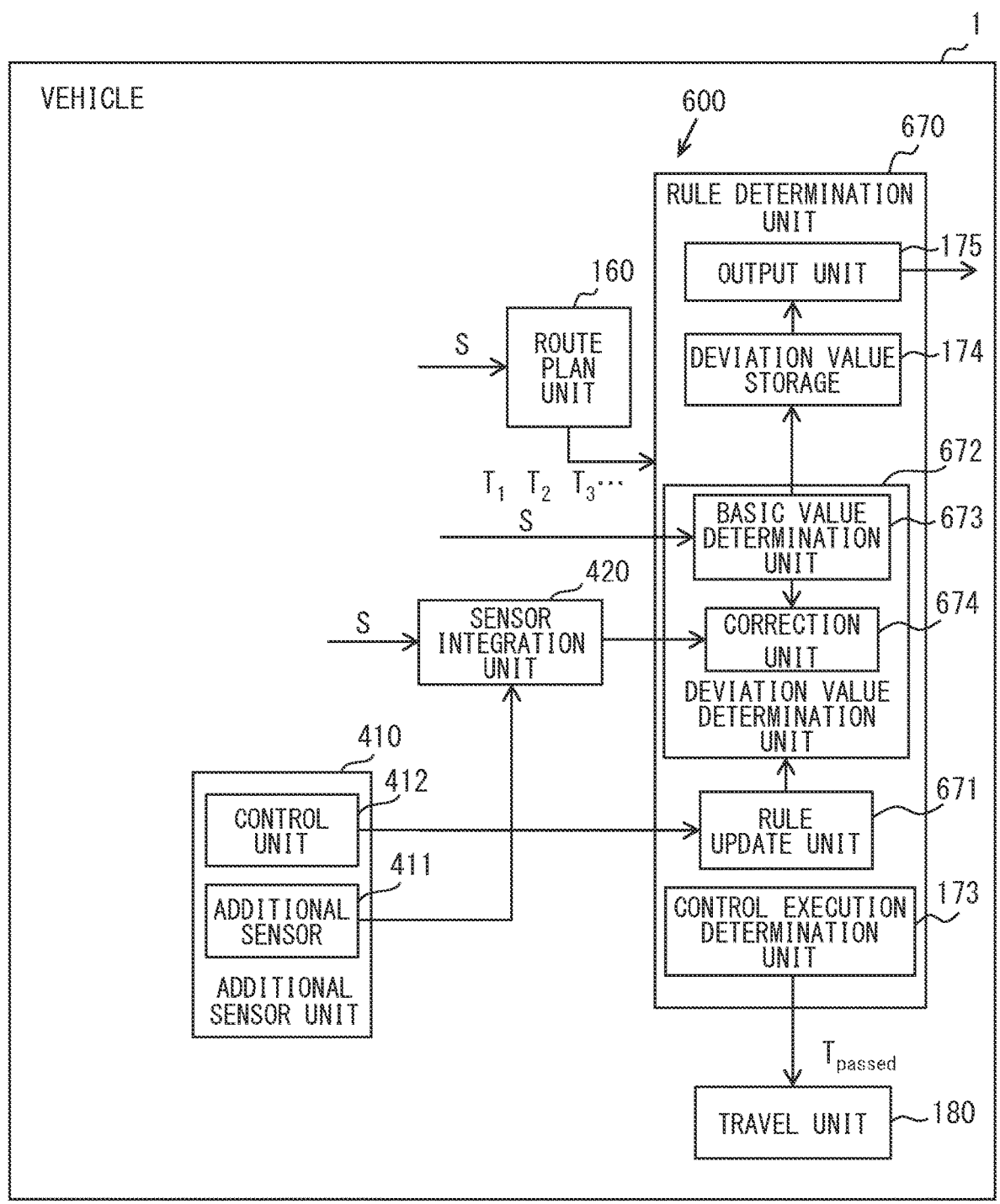
FIG. 10 is a diagram showing a configuration of an autonomous driving apparatus according to a sixth embodiment.

FIG. 10 shows a configuration of an autonomous driving apparatus 600 according to a sixth embodiment of the present disclosure. The autonomous driving apparatus 600 includes a rule update unit 671 in place of the rule update unit 471 included in the autonomous driving apparatus 400 and 500. In the present embodiment, a configuration of a deviation value determination unit 672 included in a rule determination unit 670 is different from that of the deviation value determination unit 472. The deviation value determination unit 672 includes a basic value determination unit 673 and a correction unit 674. The rule update unit 671 acquires a correction rule to be used by the correction unit 674. The rule update unit 671 is an example of the rule change unit.

The basic value determination unit 673 determines the deviation value ALval based on the sensor-based information S. The basic value determination unit 673 is the same as the reference deviation value determination unit 473 of the fourth embodiment. The rule based on which the basic value determination unit 673 determines the deviation value ALval does not consider the value detected by the additional sensor 411. The basic value determination unit 673 determines the deviation value ALval based on the sensor-based information S without using the sensor value detected by the additional sensor 411.

Information after integration by the sensor integration unit 420 is input to the correction unit 674. The correction unit 674 corrects the deviation value ALval, which is determined by the basic value determination unit 673, based on the information provided from the sensor integration unit 420 based on the correction rule acquired by the rule update unit 671. As the correction method, the deviation value ALval may be directly corrected, or the correction rule may be added to the rule to be used by the basic value determination unit 673 to determine the deviation value ALval.

In the sixth embodiment, even though the additional sensor unit 410 is added, in the rule for determining the deviation value ALval, only the correction rule needs to be changed. Therefore, when the additional sensor unit 410 is added, the rule change can be performed at a smaller scale compared with a case where the entire rule for determining the deviation value ALval is changed.

Seventh Embodiment

Figure 11:
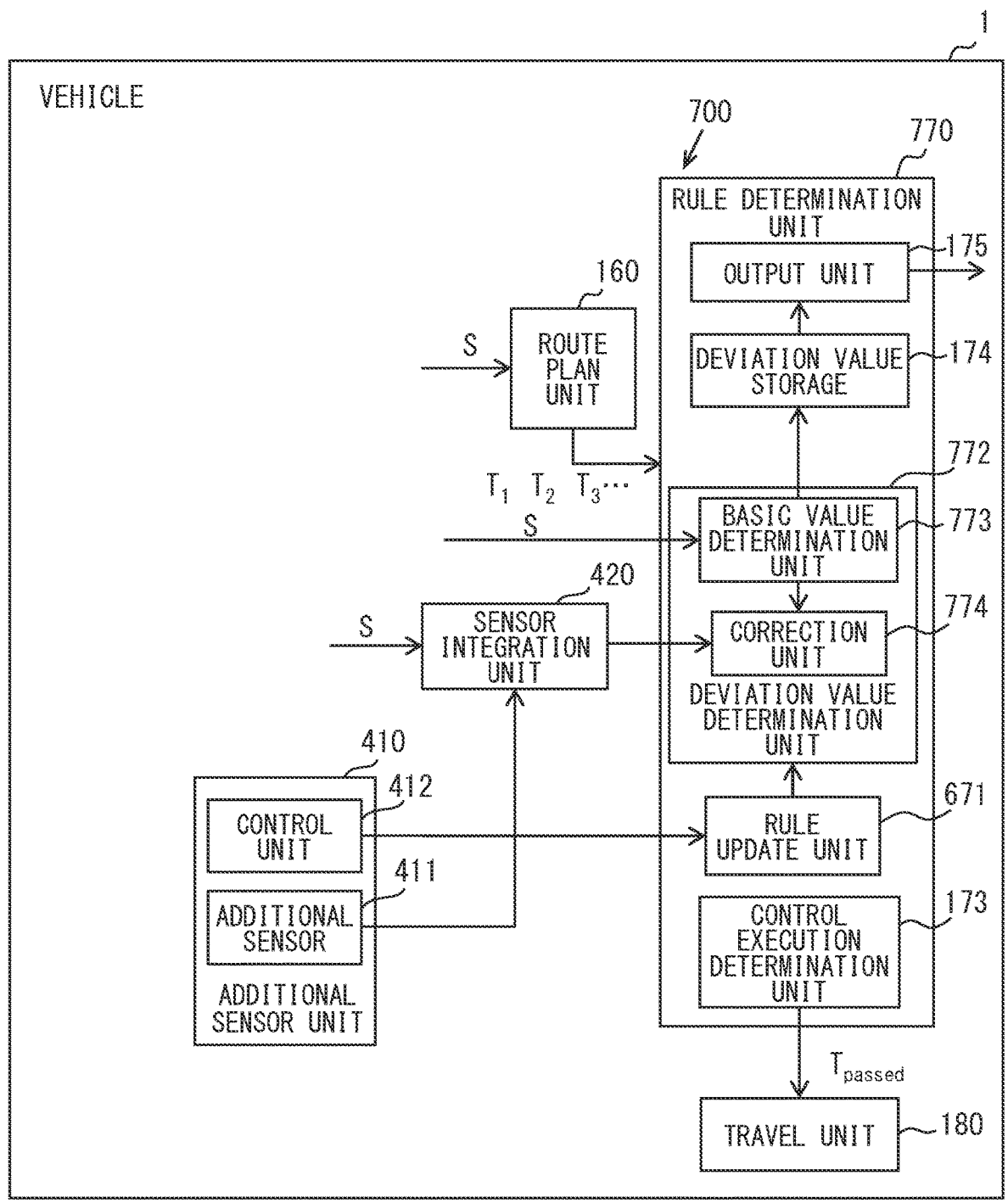
FIG. 11 is a diagram showing a configuration of an autonomous driving apparatus according to a seventh embodiment.

FIG. 11 shows a configuration of an autonomous driving apparatus 700 according to a seventh embodiment of the present disclosure. In the autonomous driving apparatus 700, a configuration of a deviation value determination unit 772 included in a rule determination unit 770 is different from that of the deviation value determination unit 672 of the sixth embodiment. The deviation value determination unit 772 includes a basic value determination unit 773 and a correction unit 674.

The rule that the basic value determination unit 773 determines the deviation value ALval in the same manner as that of the basic value determination unit 673 of the sixth embodiment. In the present embodiment, the basic value determination unit 773 is different from the basic value determination unit 673 of the six embodiment in that the process shown in FIG. 12 is executed after the deviation value ALval is determined for each candidate path Ti.

Figure 12:
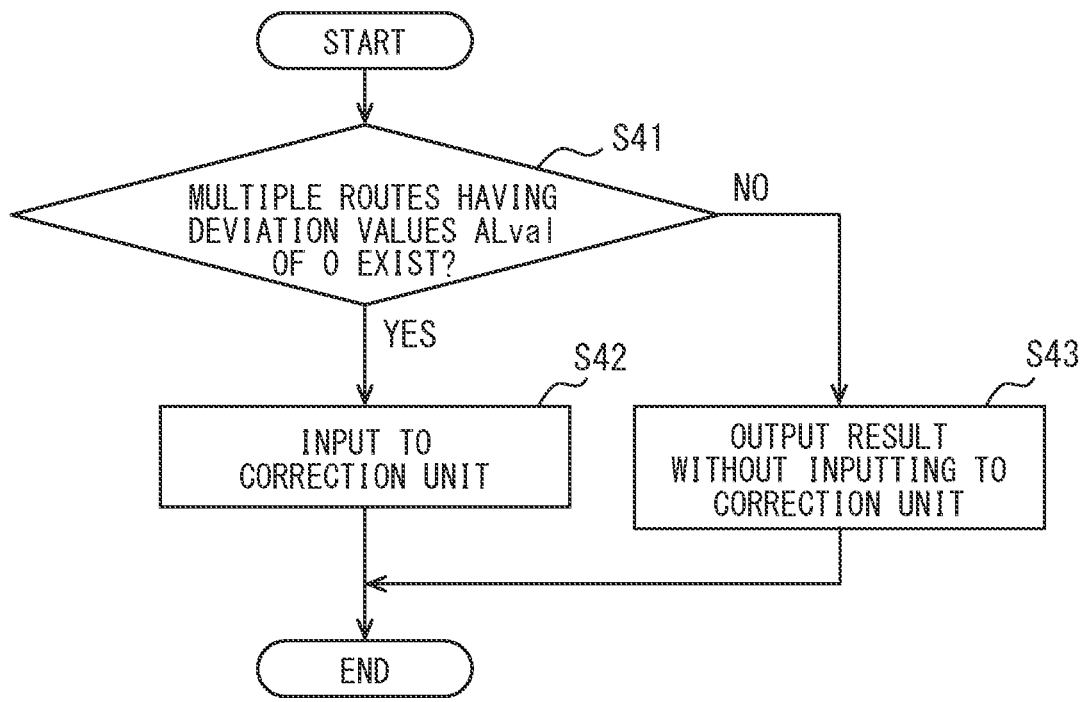
FIG. 12 is a diagram showing partial process executed by a basic value determination unit shown in FIG. 11.

As shown in FIG. 12, in S41, the process determines whether multiple candidate routes Ti having deviation values ALval of zero exist. When the determination result of S41 is YES, the process proceeds to S42. In S42, the deviation value ALval determined for each candidate route is input to the correction unit 674. When proceeding to S42, the deviation value ALval corrected by the correction unit 674 is input to the control execution determination unit 173 in the same manner as in the sixth embodiment.

When the determination result of S42 is NO, that is, when there is only one candidate route Ti having deviation value ALval of zero, which is the minimum value, the process proceeds to S43. In S43, the result determined by the basic value determination unit 773 is output to the control execution determination unit 173 without being input to the correction unit 674.

In the seventh embodiment, when multiple candidate routes Ti having deviation values ALval of zero exist (S41: YES), the correction unit 674 corrects the deviation value ALval determined by the basic value determination unit 673 (S42). As described above, the deviation values are determined by the basic value determination unit 773. When there is only one candidate route Ti having deviation value ALval of zero (S41: NO), the deviation value ALval determined by the basic value determination unit 773 is output to the control execution determination unit 173 (S43). With this configuration, the calculation processing load can be reduced as compared with a configuration where the correction unit 674 constantly corrects the deviation value.

Eighth Embodiment

Figure 13:
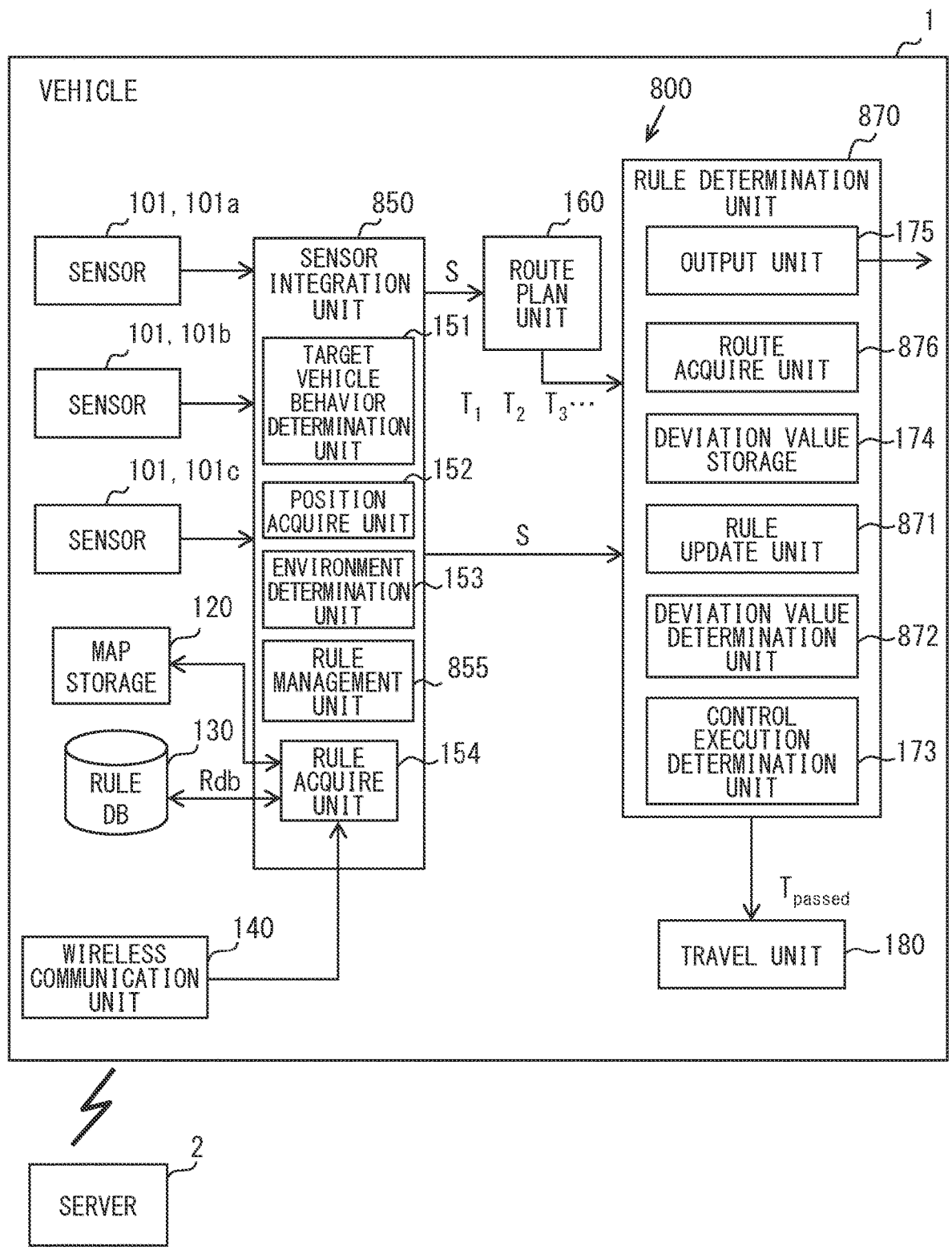
FIG. 13 is a diagram showing a configuration of an autonomous driving apparatus according to an eighth embodiment.

FIG. 13 shows a configuration of an autonomous driving apparatus 800 according to an eighth embodiment of the present disclosure. Configurations of a sensor integration unit 850 and a rule determination unit 870 of the autonomous driving apparatus 800 are different from those of the sensor integration unit 150, 420 and the rule determination unit 170, 470, 570, 670, 770 of the foregoing embodiments. Each of the rule determination unit 870 of the eighth embodiment and the rule determination units 170, 470, 570, 670, 770 of the foregoing embodiments corresponds to a rule determination apparatus. When the rule determination apparatus executes the rule determination process, the rule determination method is executed.

The sensor integration unit 850 includes a rule management unit 855 in addition to the configuration provided in the sensor integration unit 150 of the first embodiment. The rule management unit 855 manages the traveling rule so that the traveling rule according to the traveling situation is applied as the traveling rule to be used by the rule determination unit 870 for rule determination purpose.

As mentioned above, the traveling situation includes the traveling area. The traveling situation includes various factors that affect the traveling of the own vehicle 1 in addition to the traveling area. For example, the mounting state of the sensor 101 is also included in the traveling situation. When the sensor 101 is added, the detection range and detection accuracy of a periphery of the own vehicle 1 may be changed. Therefore, when the sensor 101 is added, this may affect the autonomous driving of the own vehicle. Failure or performance deterioration of the sensor 101 are also included in the traveling situation. This is because even though the sensor 101 breaks down or its performance deteriorates, the detection range and detection accuracy of the periphery of the own vehicle 1 may be changed. The long-term weather condition and short-term weather condition may also be included in the traveling situation. The specific course change situation, which will be described later for details, also corresponds to an example of the traveling situation.

The traffic rule may have an application start period. Alternatively, the traffic rule may have an application start period and an application end period. When the applicable period is specified in the traffic rule, whether the current date and time is within the applicable period of the traffic rule also corresponds to an example of the traveling situation.

The rule management unit 855 estimates the traveling situation in which the own vehicle 1 travels. The rule management unit 855 acquires, from the sensor 101 and the server 2, various information such as the position of own vehicle 1, the traveling direction of own vehicle 1, the travel plan route of own vehicle 1, a condition to which the traveling rule is applied, and the like, and then estimates the traveling situation of own vehicle 1. The condition to which the traveling rule is applied includes the traveling area and the application period of the traveling rule.

The server may store various traveling rules, and the server 2 functions as a rule distribution unit that distributes the stored traveling rules. Since some of the traveling rules have certain conditions to which they are applied, the server 2 stores, together with the traveling rules, the conditions to which the traveling rules are applied in associated manner.

The rule management unit 855 sequentially communicates with the server 2 via the wireless communication unit 140 in order to confirm whether there is a traveling rule to be newly applied by determining whether there is a traveling rule having the start period of application is close to the current time. The server 2 may be configured to notify the rule management unit 855 of that there is a traveling rule to be newly applied (that is, in push notification manner).

When the traveling rule required in the estimated traveling situation is not stored in the rule DB storage 130, the rule management unit 855 controls the rule acquiring unit 154 to acquire the required traveling rule in advance.

The rule acquiring unit 154 acquires the traveling rule from the server 2 disposed outside of the own vehicle 1 by wireless communication using the wireless communication unit 140 in response to the instruction from the rule management unit 855. When the condition to which the traveling rule is applied is stored in association with the traveling rule in the server 2, the rule acquiring unit 154 also acquires the condition to which the traveling rule is applied.

For example, when data for specifying an area to which the traveling rule is applied is stored in the server 2, the rule acquiring unit 154 also acquires the data for specifying the area to which the traveling rule is applied. When data for specifying a period to which the traveling rule is applied is stored in the server 2, the rule acquiring unit 154 also acquires the data for specifying the period to which the traveling rule is applied.

The traveling rule acquired by the rule acquiring unit 154 may be a traveling rule that is the same model as the already acquired traveling rule but has different variables. For example, the variables may include a speed limit in a model specifically implementing a traveling rule, and an inter-vehicle distance determined based on the speed limit. When the traveling rule to be acquired only has the variables different from those of the already acquired traveling rules, only the variables may be acquired instead of the whole traveling rule. Alternatively, the whole traveling rule including variables may be acquired.

The rule acquiring unit 154 stores the acquired traveling rule and related data in the rule DB storage 130. The rule management unit 855 sequentially determines the traveling situation. When it becomes necessary to change the traveling rule to be used by the deviation value determination unit 872, the rule management unit 855 provides the rule determination unit 870 with the changed traveling rule.

The rule determination unit 870 includes a control execution determination unit 173, a deviation value storage 174, an output unit 175, a rule update unit 871, a deviation value determination unit 872, and a route acquiring unit 876. The control execution determination unit 173, the deviation value storage 174, and the output unit 175 are the same as those described in the first embodiment. The route acquiring unit 876 acquires the candidate route Ti planned by the route planning unit 160. In the foregoing embodiments, the deviation value determination units 171, 472, 672, 772 have the function of the route acquiring unit 876.

When the traveling rule is provided by the rule management unit 855, the rule update unit 871 uses the provided traveling rule as the traveling rule for determining the deviation value by the deviation value determination unit 872. In the foregoing embodiments, the functions of the rule management unit 855 and the rule update unit 871 are provided by the minimum distance determination unit 172 and the deviation value determination unit 171, 472, 672, 772, which use the traveling rule.

The deviation value determination unit 872 determines the deviation value ALval using the traveling rule provided by the rule management unit 855. The deviation value ALval indicates the result of determining whether the own vehicle 1 complies with the traveling rule. The rule management unit 855 provides the rule determination unit 870 with the traveling rule corresponding to the traveling situation. The process executed by the deviation value determination unit 872 is the same as that of the deviation value determination unit 472, except that the traveling rule to be used is provided by the rule management unit 855.

In the eighth embodiment, the traveling rule to be used by the deviation value determination unit 872 for determination purpose is changed according to the traveling situation under which the own vehicle 1 is traveling. Therefore, it is possible to determine whether the autonomous driving control is appropriate corresponding to the change in the traveling situation.

Ninth Embodiment

Figure 14:
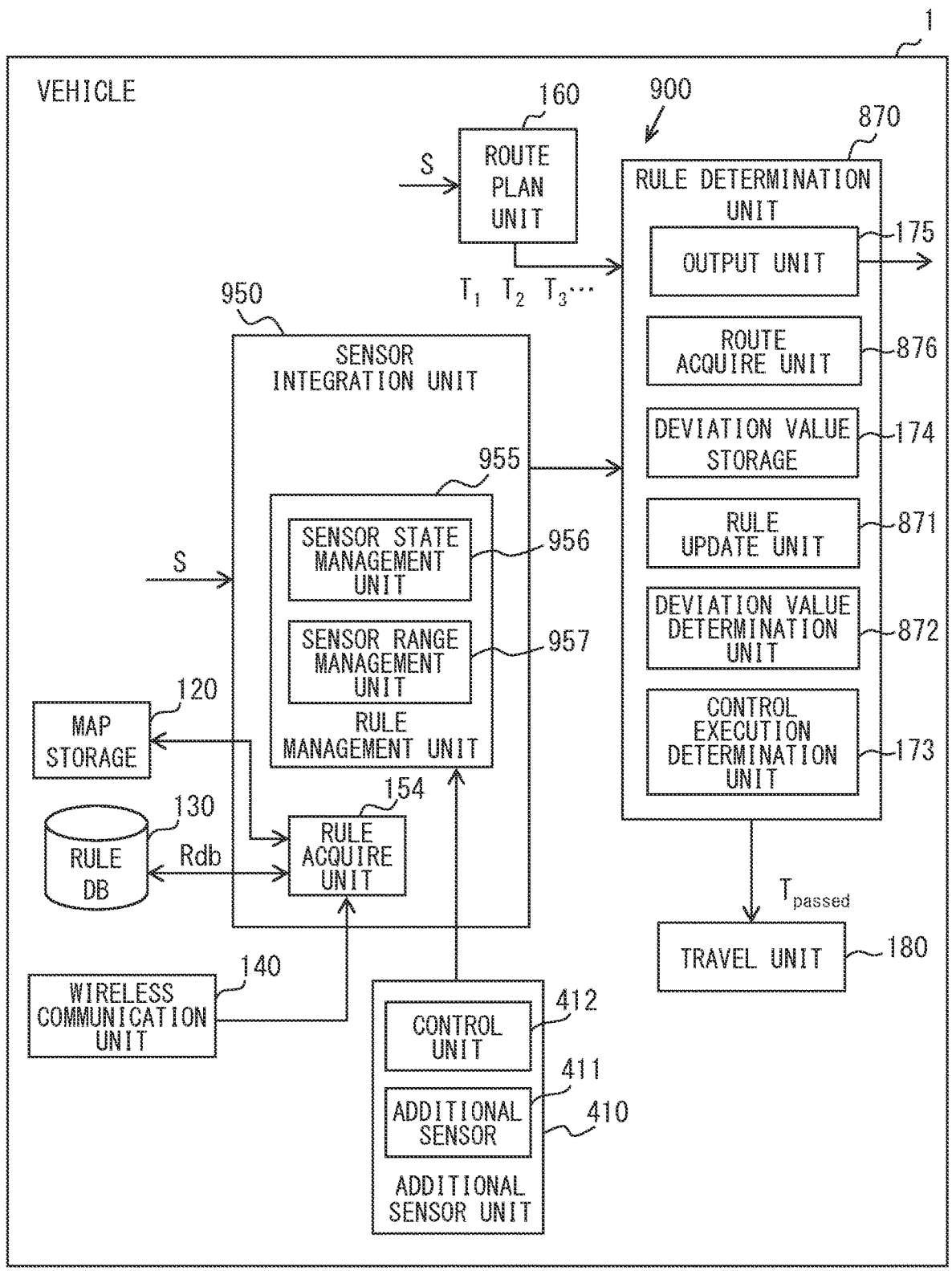
FIG. 14 is a diagram showing a configuration of an autonomous driving apparatus according to a ninth embodiment.

FIG. 14 shows a configuration of an autonomous driving apparatus 900 according to a ninth embodiment of the present disclosure. In the autonomous driving apparatus 900 of the present embodiment, a configuration of a sensor integration unit 950 is different from that of the sensor integration unit 850 of the eighth embodiment. In FIG. 14, the sensor 101 is omitted for convenience of illustration.

The sensor integration unit 950 includes a rule management unit 955 which is different from the rule management unit 855 of the eighth embodiment. Although not shown, the sensor integration unit 950 also includes the target vehicle behavior determination unit 151, the position acquiring unit 152, and the environment determination unit 153 described above.

The rule management unit 955 includes a sensor state management unit 956 and a sensor range management unit 957. The sensor state management unit 956 manages states of the sensor unit 101 and the additional sensor 411. The states of the sensor unit 101 and the additional sensor 411 are hereinafter referred to as the sensor state for simplification.

The sensor state includes various factors that affect the signals detected by the sensor unit 101 and the additional sensor 411, such as a signal-to-noise ratio, a detection resolution, presence or absence of a failure, and a necessity of calibration. The sensor state management unit 956 sequentially determines, based on the sensor-bases information S and the signal provided from the additional sensor unit 410, whether the sensor state has a change that requires a change of the traveling rule.

The following will describe an example of determining whether the sensor state has a change that requires the change of traveling rule. For example, when the sensor 101 has a failure and a signal from the sensor 101 cannot be obtained, it may be determined that there is a change in the sensor state that requires the change of traveling rule. As another example, when a signal-to-noise ratio of the sensor 101 increases to be equal to or higher than a preset threshold value, or a detected resolution of the sensor 101 decreases equal to be or lower than a preset threshold value, it may be determined that there is a change in the sensor state that requires the change of traveling rule. After calibrating the sensor 101 and a predetermined calibration period has elapsed, it may be determined that there is a change in the sensor state that requires the change of traveling rule.

The rule DB storage 130 may be configured to store the traveling rule corresponding to the sensor state, which can be estimated in advance. When the sensor state management unit 956 determines that there is a change in the sensor state that requires the change of the traveling rule, the rule management unit 955 controls the rule acquiring unit 154 to acquire the traveling rule corresponding to the sensor state after change. Then, the rule management unit 955 provides the traveling rule acquired by the rule acquiring unit 154 to the rule determination unit 870.

When the traveling rule corresponding to the sensor state after the change is stored in the rule DB storage 130, the rule acquiring unit 154 acquires, from the rule DB storage 130, the traveling rule corresponding to the sensor state after the change. The rule acquiring unit 154 may acquire the traveling rule corresponding to the sensor state after change from the server 2 by the wireless communication.

The sensor range management unit 957 manages a range that can be monitored by the sensor 101 and the additional sensor 411. For example, when the additional sensor 411, which monitors a rear area of the own vehicle 1 is added, the sensor range management unit 957 adds the rear area of the own vehicle 1 to the monitoring range. A millimeter wave radar may be provided as the sensor 101 for monitoring a front area of the vehicle. When a LiDAR is added as the additional sensor 411 for monitoring the front area, the sensor range management unit 957 updates the monitoring range in the front area of the vehicle. This is because the millimeter wave radar and the LiDAR may have respective monitoring ranges different from one another.

Further, the sensor range management unit 957 sequentially determines whether there is a change, which requires a change in the traveling rule, in the monitoring range. The change in the monitoring range may be a change in the peripheral range of the own vehicle 1, which can be monitored by the sensor 101 and the additional sensor 411. The sensor range management unit 957 may be omitted, and the sensor state management unit 956 may implement the function of the sensor range management unit 957.

The rule DB storage 130 may be configured to store the traveling rule corresponding to the monitoring range, which can be estimated in advance. When the sensor range management unit 957 determines that there is a change in the monitoring range that requires the change of the traveling rule, the rule management unit 955 controls the rule acquiring unit 154 to acquire the traveling rule corresponding to the monitoring range after change. Then, the rule management unit 955 provides the traveling rule acquired by the rule acquiring unit 154 to the rule determination unit 870.

The rule acquiring unit 154 acquires, from the rule DB storage 130 or the server 2, the traveling rule corresponding to the monitoring range after change. An example of the traveling rule corresponding to the change of monitoring range may include a traveling rule that can determine the deviation value ALval with consideration of a behavior of an object existing behind the own vehicle 1 when the monitoring range after the change further includes the rear area of own vehicle 1 by addition. This configuration can further increase a reliability of the traveling rule. Another example of the traveling rule corresponding to the change of monitoring range may include a traveling rule that can determine the deviation value ALval with consideration of behaviors of peripheral vehicles existing around the own vehicle within a broader front range when the monitoring range after the change further includes a front area in a relatively long distance provided by a relatively long detection range of the newly added LiDAR.

In the present embodiment, the acquired traveling rule may be a traveling rule that is the same model as the already acquired traveling rule but has different variables.

The following will describe an example of the traveling rule. For example, assume that the model that implements the already acquired traveling rule is the model that makes the most cautious determination about the range that cannot be confirmed by the sensor 101. When the monitoring range becomes broader due to an addition of the additional sensor 411, in the traveling rule to be acquired, the variable that defines the range for making the most cautious determination may be changed to a variable corresponding to the broader monitoring range.

The above-described traveling rule that has been acquired performs a determination based on the sensor values detected by the multiple sensors. When acquiring of the sensor values to be used in the determination of the traveling rule is failed, for the determination to be made under the sensor value whose acquirement is failed, it can be said that the own vehicle 1 does not travel corresponding to the traveling rule to be determined based on the acquiring-failed sensor value.

When the traveling rule corresponding to the addition of additional sensor 411 is changed, the deviation value determination unit 872 determines the deviation value ALval using the sensor value detected by the additional sensor 411. That is, the rule determination unit 870 including the deviation value determination unit 872 determines whether the own vehicle 1 deviates from the traveling rule by using the sensor value detected by the additional sensor 411.

When a certain sensor 101 has an operation failure, contrary to the case where the additional sensor 411 is added, the variable of the acquired traveling rule may be changed corresponding to the monitoring range that is narrowed due to the failure of the certain sensor 101.

In the ninth embodiment, a management is executed to determine whether a change occurs in the sensor state or in the monitoring range and whether the change occurred in the sensor state or the monitoring range requires a change of the traveling rule. When the sensor state or the monitoring range has a change that requires a change of the traveling rule, the traveling rule corresponding to the sensor state after the change or the monitoring range after the change is acquired. Therefore, it is possible to determine whether the autonomous driving control is appropriate corresponding to the change in the traveling situation.

Although the embodiments have been described as above, the disclosed technology is not limited to the above-described embodiments, and the following modifications are also included in the disclosed scope, and various modifications can be made without departing from the spirit of the present disclosure.

(First Modification)

In the sixth embodiment and seventh embodiment, the deviation value determination unit 672, 772 includes the basic value determination unit 673, 773 and the correction unit 674. This configuration may be applied to the configuration of the first embodiment in which the traveling rule is determined corresponding to the traveling area.

Specifically, the basic value determination unit may determine the deviation value ALval based on the rule that does not depend on the traveling area. Then, the correction unit acquires the correction rule corresponding to each traveling area, and corrects the deviation value ALval determined by the basic value determination unit based on the acquired correction rule. As the correction method, the deviation value ALval may be directly corrected, or the correction rule may be added to the rule to be used by the basic value determination unit to determine the deviation value ALval.

In the first modification, when the traveling area is changed, corresponding change of rule becomes easier as compared with a case where the entire rule for determining the deviation value ALval is changed.

(Second Modification)

In the foregoing embodiments, a part of the traveling rule is defined for each traveling area, which is described as an example of the traveling situation. Alternatively, a part of the traveling rule may be defined in different manner between a specific course change situation and a standard traveling situation. The standard traveling situation refers to a traveling situation that does not correspond to the specific course change situation. The above configuration in which a part of the traveling rule is defined in different manner between the specific course change situation and the standard traveling situation may be applied to the foregoing embodiments similar to the configuration in which a part of the traveling rule is defined corresponding to the traveling area.

The specific course change situation is a situation that satisfies the following two conditions. The first condition is satisfied when the travel plan route includes a section in which the course must be changed at least once. The second condition is satisfied when a possibility indicating that the inter-vehicle distance becomes longer than the standard minimum control permission distance is lower than a predetermined threshold within the section where the course must be changed at least once. The specific course change situation corresponds to a situation where the possibility, which indicates that the vehicle fails to change the course with the standard minimum control permission distance, is high. The course change includes the lane change. When the vehicle travels along the same lane of the road, even if the road is curved, it is not considered as the course change. The course change includes a case where the road along which the own vehicle 1 travels is changed. This is because when the road along which the own vehicle 1 travels changes, the lane of the road along which the own vehicle 1 travels also changes. Therefore, the course change includes joining at a junction.

The first and second conditions described above may be directly determined for determining whether the situation is the specific course change situation. In other words, the second condition determines whether the road after the course change is in a congested state during the traveling in the section where the course must be changed.

The second condition may be determined to be satisfied when the road after the course change is determined to be in the congested state during the traveling in the section where the course must be changed. The congestion state may be determined by a length of vehicles perform a convoy traveling at low speed. It should be noted that low speed traveling includes repeated stopping and starting. The low speed traveling may refer to a traveling of vehicle at a speed of, for example, 40 km/h or lower. A lower traveling speed, for example, being equal to or lower than 30 km/h or being equal to or lower than 20 km/h may be determined as the low speed traveling. The length of vehicles that perform the convoy traveling may be set to, for example, 1 km. Alternatively, a distance shorter than 1 km or a distance longer than 1 km may be set to the condition of traffic congestion state.

The inter-vehicle distance is short in the traffic congestion state. Thus, the number of vehicles per unit road length increases. Therefore, the traffic congestion state may be determined when the number of vehicles per unit road length is equal to or greater than a predetermined threshold quantity.

Figure 15:
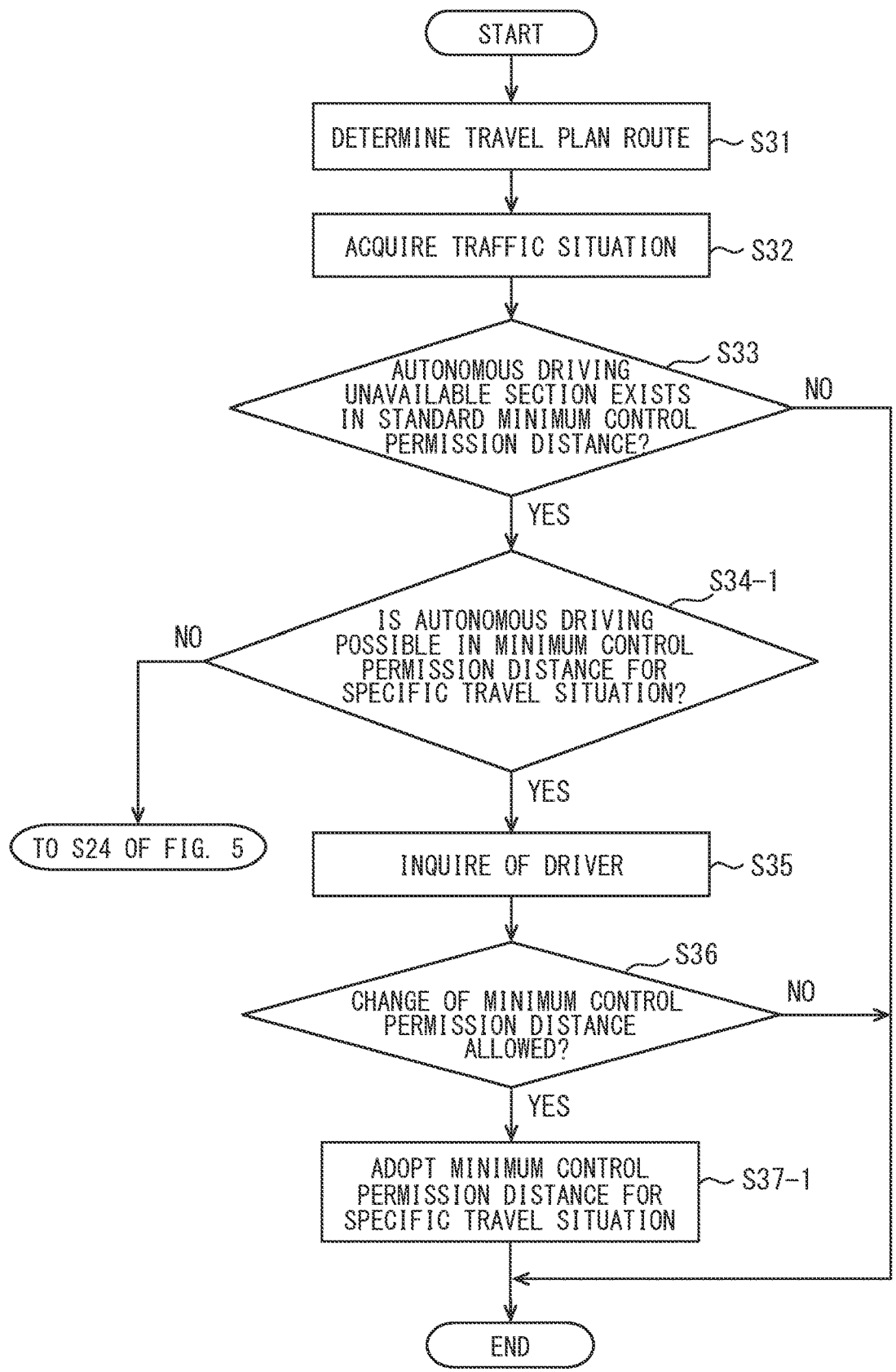
FIG. 15 is a diagram showing a process executed by a route determination unit and a confirmation control unit according to a second modification.

In the second modification, the process shown in FIG. 15 may be executed. The process shown in FIG. 15 differs from the process shown in FIG. 7 in that S34-1 is executed instead of S34 in FIG. 7, and S37-1 is executed instead of S37. The process in S34-1 is executed when the process determines, in S33, that the course change cannot be performed by the autonomous driving using the standard minimum control permission distance within the area, that is, YES in S33. When the process YES in S33, it can be said that the area corresponds to the specific course change situation.

In S34-1, the process determines whether the course change by the autonomous driving is possible using the minimum control permission distance corresponding to the specific course change situation. Specifically, for the traffic condition acquired in S32, the process determines whether a possibility, which indicates the inter-vehicle distance at a time of the course change is longer than the minimum control permission distance corresponding to the specific course change situation, is equal to or higher than the second threshold value. Herein, the minimum control permission distance corresponding to the specific course change situation is determined based on a predetermined relationship which determines the minimum control permission distance corresponding to the specific course change situation. The second threshold value is set to be equal to or higher than the first threshold value. The relationship that determines the minimum control permission distance corresponding to the specific course change situation may be determined, in advance, by learning, similar to the rule for determining the minimum control permission distance corresponding to the traveling area.

When the determination result in S34-1 is NO, the process proceeds to S24 of FIG. 5. When the determination result in S34-1 is YES, the process proceeds to S35. In S35, in response to the determination result of YES in S34-1, the process inquires the occupant of the own vehicle 1 for whether to permit the autonomous driving control in which the minimum control permission distance is changed. When the occupant permits, by an instruction, the autonomous driving control in which the minimum control permission distance is changed (S36: YES), in S37-1, the process performs the autonomous driving in the specific course change situation using the minimum control permission distance corresponding to the specific course change situation. Alternatively, the process in S35 and S36 may be omitted. That is, the inquiry to the occupant of the own vehicle 1 for permission of autonomous driving control in which the minimum control permission distance is changed may be omitted. In this case, in response to the process determining YES in S34-1, the process may proceed to S37-1.

(Third Modification)

In the fourth embodiment to seventh embodiment, an example in which the additional sensor 411 is added is described as one example of the change of sensor. The change of sensor may include addition of sensor, update of sensor, deletion of sensor, or the like.

(Fourth Modification)

Some functions of the autonomous driving apparatus described in the foregoing embodiments and modifications may be provided by an external device of the own vehicle 1 (for example, the server 2).

(Fifth Modification)

A predetermined notification unit may be provided to notify the user of a change in the traveling rule.

(Sixth Modification)

The deviation value ALval may have a value of either 0 or 1. One of the values 0 and 1 may indicate that the own vehicle 1 follows the traveling rule, and the remaining one of the values 0 and 1 may indicate that the own vehicle 1 does not follow the traveling rule.

(Seventh Modification)

The sensor integration unit 150, the route planning unit 160, the rule determination unit 170, 470, 570, 670, and the traveling unit 180 are implemented by respective control units as described below. The control units and the method thereof described in the present disclosure may be implemented by a special purpose computer including a processor programmed to perform one or more functions implemented by a computer program. Alternatively, the control units and the method described in the present disclosure may be implemented by a dedicated hardware logic circuit. Alternatively, the control units and the method thereof described in the present disclosure may be implemented by one or more dedicated computers configured to include a combination of a processor for executing computer program and at least one hardware logic circuit. The hardware logic circuit may be, for example, ASIC or FPGA.

Further, the storage medium for storing the computer program is not limited to the ROM, and it may also be stored in a computer-readable non-transitory tangible storage medium as instructions to be executed by the computer. For example, the above program may be stored in a flash memory.

What is claimed is:

1. An autonomous driving apparatus used in a subject vehicle capable of performing an autonomous driving, the autonomous driving apparatus comprising:
   a deviation value determination unit determining a deviation value of each of one or more candidate routes based on a comparison result between an inter-vehicle distance and a minimum control permission distance, the inter-vehicle distance being a distance between the subject vehicle and a peripheral vehicle existing around the subject vehicle, the deviation value indicating a possibility of the subject vehicle deviating from a traveling rule in a case where the subject vehicle travels along the corresponding candidate route, the one or more candidate routes being planned by a route planning unit such that each of the one or more candidate routes enables the subject vehicle to continue traveling;
   a control execution determination unit selecting, from the one or more candidate routes, one candidate route having the deviation value within a control permission range as a target route of the subject vehicle, and outputting an instruction for controlling the subject vehicle to travel along the selected target route to a traveling unit, which executes a traveling control of the subject vehicle; and
   a rule update unit updating a determination rule of the deviation value, which is used by the deviation value determination unit to determine the deviation value, in response to a change in a sensor, which detects a behavior of at least one of the subject vehicle or the peripheral vehicle.

2. The autonomous driving apparatus according to claim 1, further comprising:
   a reference deviation value determination unit determining the deviation value using the determination rule before an update; and
   an output unit outputting the deviation value determined by the reference deviation value determination unit.

3. The autonomous driving apparatus according to claim 1, wherein
   the deviation value determination unit includes:
      a basic value determination unit determining the deviation value using the determination rule which is defined to be unchangeable in advance; and
      a correction unit correcting the deviation value determined by the basic value determination unit using a correction rule, and
   the rule update unit acquires the correction rule to be used by the correction unit.

4. The autonomous driving apparatus according to claim 3, wherein
   the rule update unit acquires the correction rule corresponding to a traveling area of the subject vehicle as the correction rule to be used by the correction unit, and
   the correction unit corrects, using the acquired correction rule corresponding to the traveling area of the subject vehicle, the deviation value determined by the basic value determination unit.

5. The autonomous driving apparatus according to claim 3, wherein
   the rule update unit acquires the correction rule corresponding to an addition of a sensor as the correction rule to be used by the correction unit, and
   the correction unit acquires a sensor value detected by the sensor that is added, and corrects, using the acquired sensor value, the deviation value determined by the basic value determination unit.

6. The autonomous driving apparatus according to claim 3, wherein,
   in a case where multiple candidate routes, which have the smallest deviation values determined by the basic value determination unit, exists, the deviation value determination unit controls the correction unit to correct the deviation values determined by the basic value determination unit, and
   in a case where only one candidate route, which has the smallest deviation value determined by the basic value determination unit, exists, the deviation value determination unit outputs the deviation value determined by the basic value determination unit to the control execution determination unit.

7. An autonomous driving apparatus to be used in a subject vehicle capable of performing an autonomous driving, the autonomous driving apparatus comprising:

a rule determination unit determining whether the subject vehicle travels according to a traveling rule in a case where the subject vehicle travels along each of one or more candidate routes, which are planned by a route planning unit such that each of the one or more candidate routes enables the subject vehicle to continue traveling;

a rule management unit managing the traveling rule to be used by the rule determination unit corresponding to a traveling situation; and a rule update unit updating the traveling rule to be used by the rule determination unit corresponding to the traveling situation; and wherein a traveling control of the subject vehicle is executed based on the updated traveling rule.

8. The autonomous driving apparatus according to claim 7, wherein the rule management unit estimates the traveling situation in which the subject vehicle travels, and the autonomous driving apparatus further comprises a rule acquiring unit that acquires the traveling rule corresponding to the traveling situation estimated by the rule management unit.

9. The autonomous driving apparatus according to claim 8, wherein the rule acquiring unit acquires the traveling rule corresponding to the traveling situation via a wireless communication between the subject vehicle and an external source.

10. The autonomous driving apparatus according to claim 8, wherein the rule acquiring unit acquires data that specifies an application area of the acquired traveling rule in a case where the acquired traveling rule is defined to be applied in the application area.

11. The autonomous driving apparatus according to claim 8, wherein the rule acquiring unit acquires data that specifies an application period of the acquired traveling rule in a case where the acquired traveling rule is defined to be applied during the application period.

12. The autonomous driving apparatus according to claim 8, wherein the rule acquiring unit acquires, as the traveling rule corresponding to the traveling situation, a traveling rule, which has a same model as the traveling rule that has been acquired but has different variables from the traveling rule that has been acquired.

13. The autonomous driving apparatus according to claim 7, wherein the rule determination unit determines whether the subject vehicle travels according to the traveling rule based on each of sensor values detected by respective sensors, in a case where one of the sensor values cannot be acquired, the rule determination unit determines that the subject vehicle does not travel according to the traveling rule that is required to be determined based on the one of the sensor values, and in a case where a new sensor is added to provide the one of the sensor values, the rule determination unit determines whether the subject vehicle travels according to the traveling rule based on the one of the sensor values detected by the new sensor.

14. A rule determination apparatus comprising:

a rule determination unit determining whether a subject vehicle to which an autonomous driving apparatus is mounted travels according to a traveling rule in a case where the subject vehicle travels along each of one or more candidate routes, which are planned by a route planning unit such that each of the one or more candidate routes enables the subject vehicle to continue traveling; and a rule update unit updating, corresponding to a traveling situation, the traveling rule used in the determining executed by the rule determination unit; and wherein a traveling control of the subject vehicle is executed based on the updated traveling rule.

* * * * *